(12) United States Patent
Hasegawa et al.

(10) Patent No.: US 8,273,479 B2
(45) Date of Patent: Sep. 25, 2012

(54) NEGATIVE ELECTRODE FOR LITHIUM SECONDARY CELL AND LITHIUM SECONDARY CELL USING THE SAME

(75) Inventors: Masaki Hasegawa, Osaka (JP); Masaya Ugaji, Osaka (JP); Keisuke Ohara, Osaka (JP); Hitoshi Matsumoto, Wakayama (JP)

(73) Assignee: Panasonic Corporation, Osaka (JP)

( * ) Notice: Subject to any disclaimer, the term of this patent is extended or adjusted under 35 U.S.C. 154(b) by 388 days.

(21) Appl. No.: 12/597,697

(22) PCT Filed: Apr. 11, 2008

(86) PCT No.: PCT/JP2008/000960
§ 371 (c)(1),
(2), (4) Date: Oct. 26, 2009

(87) PCT Pub. No.: WO2008/139682
PCT Pub. Date: Nov. 20, 2008

(65) Prior Publication Data
US 2010/0119948 A1    May 13, 2010

(30) Foreign Application Priority Data
Apr. 27, 2007  (JP) .................................. 2007-119352

(51) Int. Cl.
*H01M 4/13*  (2010.01)
*H01M 4/58*  (2010.01)
*H01M 4/02*  (2006.01)
(52) U.S. Cl. ................. 429/218.1; 429/209; 429/231.95
(58) Field of Classification Search .................. 429/209, 429/212, 218.1, 231.95
See application file for complete search history.

(56) References Cited

U.S. PATENT DOCUMENTS

| | | |
|---|---|---|
| 2005/0074671 A1 | 4/2005 | Sugiyama et al. |
| 2006/0099507 A1 | 5/2006 | Kogetsu et al. |
| 2006/0134518 A1 | 6/2006 | Kogetsu et al. |
| 2007/0031733 A1 | 2/2007 | Kogetsu et al. |
| 2009/0117462 A1 | 5/2009 | Okazaki et al. |
| 2009/0117472 A1 | 5/2009 | Iwamoto |

FOREIGN PATENT DOCUMENTS

| | | |
|---|---|---|
| JP | 2004-127561 | 4/2004 |
| JP | 2006-164954 | 6/2006 |
| JP | 2006-196447 | 7/2006 |
| JP | 2008-117755 | 5/2008 |
| WO | WO 2007/015419 A1 | 2/2007 |
| WO | WO 2007/046322 A1 | 4/2007 |
| WO | WO 2007/086411 A1 | 8/2007 |
| WO | WO 2007/094311 A1 | 8/2007 |
| WO | WO 2008/111315 A1 | 9/2008 |

*Primary Examiner* — Carlos Barcena
(74) *Attorney, Agent, or Firm* — McDermott Will & Emery LLP

(57) ABSTRACT

A negative electrode for a lithium secondary battery according to the present invention includes a current collector 12, and an active material layer 14 formed on the current collector 12. The active material layer 14 includes a plurality of negative-electrode active material members 16 disposed on the current collector 12. Each negative-electrode active material member 16 is oxide, including a first region 18 of a relatively high oxygen concentration and a plurality of second regions 20 having an oxygen concentration which is lower than that of the first region 18. The first region 18 extends from a bottom face of each negative-electrode active material member 16 in a direction away from the surface of the current collector. The plurality of second regions 20 are alternately disposed on both sides of the first region 18.

10 Claims, 7 Drawing Sheets

(a)  (b)

(a)

(b)

(a)

(b)

NEGATIVE ELECTRODE FOR LITHIUM SECONDARY CELL AND LITHIUM SECONDARY CELL USING THE SAME

RELATED APPLICATIONS

This application is the U.S. National Phase under 35 U.S.C. §371 of International Application No. PCT/JP2008/000960, filed on Apr. 11, 2008, which in turn claims the benefit of Japanese Application No. 2007-119352, filed on Apr. 27, 2007, the disclosures of which Applications are incorporated by reference herein.

TECHNICAL FIELD

The present invention relates to a negative electrode for a lithium secondary battery and a lithium secondary battery having the same, as well as a method of producing a negative electrode for a lithium secondary battery.

BACKGROUND ART

In recent years, with the development of portable devices such as personal computers and mobile phones, there is an increasing need for batteries as their power supplies. Batteries to be used for such purposes are required to have a high energy density and excellent cycle characteristics. Against such requirements, for both the positive electrode and the negative electrode, high-capacity active materials are being newly developed. Among others, an elemental, oxide, or alloy form of silicon (Si) or tin (Sn), which can provide a very high capacity, is regarded as a promising negative-electrode active material.

However, when a negative electrode for a lithium secondary battery is constructed by using such negative-electrode active materials, there is a problem in that the negative electrode will be deformed through repetition of charging and discharging. The aforementioned negative-electrode active materials undergo significant volumetric changes when reacting with lithium ions. Therefore, at the time of charging and discharging, the negative-electrode active material will undergo significant expansion/contraction due to reactions of insertion and desorption of lithium ions with respect to the negative-electrode active material. Therefore, in a negative electrode of a structure in which an active material layer containing a negative-electrode active material as mentioned above is formed on a current collector, when charging and discharging are repeated, a large stress may occur near the interface between the active material layer and the current collector to cause strain, thus resulting in wrinkles and breaks of the negative electrode, peeling of the active material layer, and so on. Moreover, due to the expansion stress of the negative-electrode active material, the active material layer may be cracked, or a portion of the active material layer may become pulverized. Furthermore, when the negative electrode is strained and deformed, a space may be created between the negative electrode and the separator, so that the charging and discharging reaction may become nonuniform, thus locally deteriorating the battery characteristics. Therefore, it has been difficult to obtain a lithium secondary battery having sufficient charge-discharge cycle characteristics by using the aforementioned negative-electrode active material.

In order to solve such problems, a construction has been proposed in which spaces for alleviating an expansion stress of the negative-electrode active material are provided in the negative electrode, thereby suppressing deformation of the negative electrode.

Patent Document 1 discloses an electrode structure in which a plurality of pillar-like members are regularly arrayed on a current collector, the pillar-like members being made of an active material which forms an alloy with lithium. With this electrode structure, at the time of charging, each pillar-like member expands so as to fill the voids between pillar-like members, so that the stress acting on the entire negative electrode can be alleviated, whereby strain of the negative electrode and peeling of the active material can be suppressed.

Patent Document 2 proposes a negative electrode structure in which a plurality of pillar-like active material particles, made of a negative-electrode active material, are formed on a current collector. In Patent Document 2, vapor deposition of the active material is performed from a direction which is tilted with respect to the normal direction of the current collector surface (oblique vapor deposition), thereby forming active material particles whose longitudinal direction is tilted with respect to the normal direction of the current collector surface. With this structure, too, spaces for allowing the active material particles to expand can be obtained between active material particles, whereby deformation of the negative electrode due to an expansion stress can be suppressed.

On the other hand, a construction has been proposed which reduces deformation of a negative electrode by dispersing the expansion stress of the negative-electrode active material. For example, Patent Document 3 discloses a negative electrode of a structure such that, in an active material layer which mainly contains silicon and oxygen, the oxygen content is varied so that layers having a low expansion rate upon charging and layers having a high expansion rate upon charging are alternately stacked. In the negative electrode of Patent Document 3, since layers having a low expansion rate are inserted between layers having a high expansion rate, the expansion rate of the entire active material layer is kept small, and the layered structure allows the stress due to an expansion of the layers having a high expansion rate, i.e., a smaller oxygen content, to be dispersed. As a result, it is possible to suppress peeling and pulverization of the active material layer due to an expansion stress of the active material layer, and reduce deterioration of the charge-discharge cycle characteristics.

[Patent Document 1] Japanese Laid-Open Patent Publication No. 2004-127561
[Patent Document 2] Pamphlet of International Publication No. 2007/015419
[Patent Document 3] Japanese Laid-Open Patent Publication No. 2006-196447

DISCLOSURE OF INVENTION

Problems to be Solved by the Invention

With the structures of Patent Document 1 and Patent Document 2, a plurality of structures (hereinafter referred to as "active material members") made of an active material, e.g., pillar-like members or active material particles, are disposed on a current collector with spaces for their own expansion, so that the expansion stress of the entire electrode can be alleviated, whereby deformation of the negative electrode can be reduced. However, the expansion stress occurring in the interior of each active material member may not be sufficiently dispersed, and there is a possibility that the active material members may be cracked or pulverized through repetitive expansion and contraction due to charging and discharging. Therefore, it is difficult to effectively suppress deterioration of the charging and discharging cycles.

In the negative electrode disclosed in Patent Document 3, if the proportion of the thickness of the active material layer relative to the thickness of the current collector is increased in order to realize a high capacity, the active material layer may significantly expand along the vertical direction (direction of layering) at the time of charging, ant is expansion stress may deform the electrode group, including a separator and a positive electrode. As a result, not only the negative electrode but also the positive electrode may be deformed.

Thus, with conventional electrode structures, it is difficult sufficiently reduce deformation of the negative electrode, peeling of the active material layer, pulverization, and the like due to an expansion stress of the active material, and it is difficult suppress deterioration of the charge-discharge cycle characteristics due to an expansion stress of the active material.

The present invention has been made in view of the above circumstances, and an objective thereof is to reduce deformation of a negative electrode due to an expansion stress of negative-electrode active material members, and suppress peeling of the negative-electrode active material members from a current collector as well as their pulverization, thereby improving the charge-discharge cycle characteristics of a lithium secondary battery.

Means for Solving the Problems

A negative electrode for a lithium secondary battery according to the present invention comprises a current collector and an active material layer formed on the current collector, wherein the active material layer includes a plurality of negative-electrode active material members disposed on the current collector. Each negative-electrode active material member is oxide, including a first region of a relatively high oxygen concentration and a plurality of second regions having an oxygen concentration which is lower than that of the first region. The first region extends from a bottom face of each negative-electrode active material member in a direction away from a surface of the current collector, and the plurality of second regions are disposed alternately on both sides of the first region.

In a negative electrode for a lithium secondary battery according to the present invention, the active material layer includes a plurality of negative-electrode active material members, so that, even if the negative-electrode active material members expand by occluding lithium ions upon charging, spaces for their expansion are guaranteed between negative-electrode active material members. Therefore, the expansion stress acting on the current collector is alleviated, whereby deformation of the negative electrode due to repetitive charging and discharging can be suppressed.

Moreover, each negative-electrode active material member is oxide, including a first region of a relatively high oxygen concentration and a plurality of second regions having an oxygen concentration which is lower than that of the first region. When the negative-electrode active material is oxide, as the oxygen concentration becomes lower, the lithium occlusion ability is higher and therefore the rate of volumetric expansion at the time of charging is higher; as the oxygen concentration becomes higher, the lithium occlusion ability is lowered, and the rate of volumetric expansion at the time of charging also becomes lower. Therefore, according to the present invention, while ensuring a high charge-discharge capacity with the second regions having a low oxygen concentration, the first region having a high oxygen concentration reduces the expansion rate of the negative-electrode active material members, and allows the expansion stress occurring in the second regions to be dispersed.

Furthermore, in each negative-electrode active material member, the first region extends from the bottom face of the negative-electrode active material member in a direction away from the surface of the current collector, such that the plurality of second regions are alternately disposed on both sides of the first region. As a result, the expansion stress along a direction from the bottom face to the upper face of the negative-electrode active material member (hereinafter referred to as the "vertical direction") and along a direction which is parallel to the surface of the current collector (hereinafter referred to as the "lateral direction") can be effectively alleviated. Moreover, since the first region having a small expansion rate continues from the bottom face toward the upper face of the negative-electrode active material member, even if the second regions undergo expansion/contraction due to charging and discharging, an effect of maintaining the shape of the negative-electrode active material member is obtained. Therefore, peeling of the negative-electrode active material members and cracking and pulverization of the negative-electrode active material members due to the expansion stress can be suppressed.

Thus, by using the negative electrode according to the present invention, it becomes possible to provide a lithium secondary battery having excellent charge-discharge cycle characteristics.

Effects of the Invention

According to the present invention, in a negative electrode having an active material layer which includes a plurality of negative-electrode active material members, deformation of the negative electrode due to an expansion stress of the negative-electrode active material can be reduced, and also peeling of the negative-electrode active material members from the current collector as well as their cracking and pulverization can be suppressed, whereby the charge-discharge cycle characteristics of a lithium secondary battery can be improved.

Figure 1:
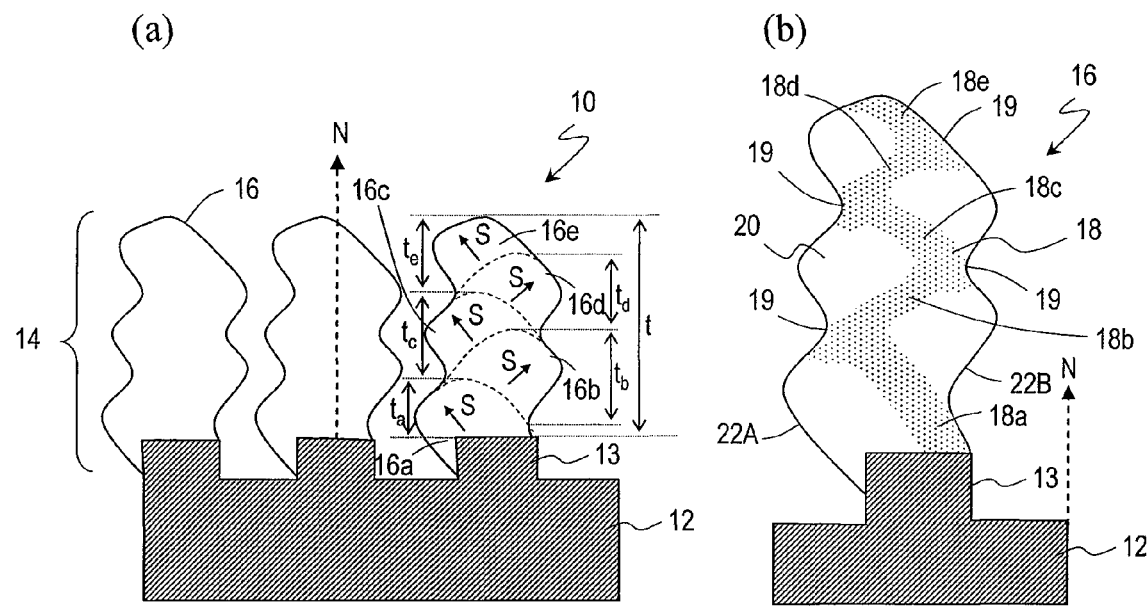
FIG. 1 (a) is a schematic cross-sectional view of a negative electrode for a lithium secondary battery according to an embodiment of the present invention, and (b) is a schematic enlarged cross-sectional view showing an example of one negative-electrode active material member.

DESCRIPTION OF REFERENCE NUMERALS 10 negative electrode
12 current collector
14 active material layer
16 negative-electrode active material member
18 first region
20 second region
22A, 22B side face of negative-electrode active material member
16a, 16b, 16c, 16d, 16e portion of negative-electrode active material member
18a, 18b, 18c, 18d, 18e, 18f, 18g high-oxygen concentration portion
30 vapor deposition apparatus
32 chamber
33 stage
34a, 34b, 34c nozzle
35a, 35b, 35c tube
36, 36a, 36b evaporation source
39 horizontal plane
50 stacked type lithium secondary battery
52 positive electrode
52a positive electrode current collector
52b positive-electrode active material layer
53 negative electrode
53a negative electrode current collector
53b negative-electrode active material layer
54 separator
55 outer case
56 positive electrode lead
57 negative electrode lead
58 resin material

BEST MODE FOR CARRYING OUT THE INVENTION

Hereinafter, with reference to the drawings, a negative electrode for a lithium secondary battery according to a preferable embodiment of the present invention will be described.

First, FIGS. 1(a) and (b) are referred to. FIG. 1(a) is a schematic cross-sectional view of a negative electrode for a lithium secondary battery of the present embodiment, and FIG. 1(b) is a schematic enlarged cross-sectional view showing an oxygen concentration distribution of one negative-electrode active material member.

The negative electrode 10 includes a current collector 12 and an active material layer 14 formed on the current collector 12. The active material layer 14 includes a plurality of negative-electrode active material members 16 disposed on the current collector 12. In the present embodiment, a plurality of bumps 13 are regularly arrayed on the surface of the current collector 12, such that each negative-electrode active material member 16 is disposed on the corresponding bump 13. As a negative-electrode active material, the negative-electrode active material members 16 contain an oxide such as silicon oxide or tin oxide.

As shown in FIG. 1(a), each negative-electrode active material member 16 in the present embodiment is divided into a plurality of portions depending on changes in its growth direction S. Herein, it has five portions from the current collector 12 side, i.e., a first portion 16a to a fifth portion 16e. The growth directions S of the portions 16a to 16e are tilted with respect to the normal direction N of the current collector 12. For example, the negative-electrode active material members 16 as such can be formed by performing a plurality of vapor deposition steps (in this example, first to fifth vapor deposition steps) while switching the evaporation direction of the negative-electrode active material with respect to the normal direction N of the current collector 12, as will be described in detail later.

Note that the normal direction N of the surface of the current collector 12 in the present specification refers to a direction perpendicular to an imaginary plane which is obtained by averaging out the ruggednesses on the surface of the current collector 12. In the case where a plurality of bumps 13 are regularly formed on the surface of the current collector 12 as in the illustrated example, a plane that contains the uppermost faces or apices of these bumps is the surface of the current collector 12.

In the illustrated example, the growth direction S of the first portion 16a and the growth direction S of the second portion 16b are tilted toward opposite sides with respect to the normal direction N of the current collector 12. Moreover, the growth directions S of the third portion 16c and the fifth portion 16e are substantially parallel to the growth direction S of the first portion 16a, and the growth direction S of the fourth portion 16d is substantially parallel to the growth direction S of the second portion 16b. Note that the growth directions S of the portions 16a to 16e of each negative-electrode active material member 16 are not particularly limited, but may be selected as appropriate by controlling the evaporation directions of the corresponding vapor deposition steps.

Moreover, as shown in FIG. 1(b), each negative-electrode active material member 16 in the present embodiment includes a first region 18 of a relatively high oxygen concentration and a plurality of second regions 20 having an oxygen concentration which is lower than that of the first region 18.

The first region 18 extends from the bottom face of each negative-electrode active material member 16 (the face which is closer to the current collector 12), in a direction away from the surface of the current collector 12. The plurality of second regions 20 are alternately disposed on both sides of the first region 18. Such a construction can be confirmed by analyzing the oxygen concentration in a cross section of the negative-electrode active material member 16 which is perpendicular to the surface of the current collector 12 and which contains the growth directions S by using an x-ray microanalyzer, for example. Alternatively, it can be confirmed based on a density gradation under an SEM observation.

Preferably, the first region 18 in the present embodiment extends in a zigzag manner from the bottom face of each negative-electrode active material member 16, in a direction away from the surface of the current collector 12. As used herein, to "extend in a zigzag manner" means that the first region 18 extends, in the interior of the negative-electrode active material member 16, in a direction away from the surface of the current collector 12 while inverting its tilting direction with respect to the normal direction N of the surface of the current collector 12. In the illustrated example, the first region 18 is divided into five portions (referred to as "high-oxygen concentration portions") 18a to 18e based on the tilting direction from the normal direction N. The high-oxygen concentration portion 18a, which is the closest to the current collector 12, is formed in the first portion 16a, and in the illustrated cross section, extends in a direction which is tilted toward a side face 22A of the negative-electrode active material member 16 from the normal direction N of the surface of the current collector 12. The high-oxygen concentration portion 18b disposed on the high-oxygen concentration portion 18a is formed in the interior of the second portion 16b, and is tilted toward the opposite side from the tilting direction of the high-oxygen concentration portion 18a with respect to the normal direction N of the current collector 12, i.e., toward a side face 22B of the negative-electrode active material member 16. The high-oxygen concentration portion 18a and the high-oxygen concentration portion 18b are in contact at the side face 22A of the negative-electrode active material member 16. Similarly, the portions 18c to 18e are each formed so as to be in contact with an underlying high-oxygen concentration portion, and extend in a direction which is tilted with respect to the normal direction N toward the opposite side from the tilting direction of an underlying high-oxygen concentration portion. In the present specification, any portion of the first region 18 where two high-oxygen concentration portions meet that are tilted in opposite directions with respect to the normal direction N of the current collector 12, i.e., any portion 18 at which the tilting direction of the first region 18 changes, is referred to as a "bent portion". In the present embodiment, a plurality of bent portions 19 of the first region 18 are disposed alternately on the side faces 22A and 22B of the negative-electrode active material member 16.

Since the active material layer 14 of the negative electrode 10 of the present embodiment is composed of a plurality of negative-electrode active material members 16 having the aforementioned first and second regions 18 and 20, the following advantages are obtained.

In the case where an oxide is used as the negative-electrode active material, its lithium ion occlusion ability changes depending on the oxygen concentration. Specifically, as the oxygen concentration becomes lower, the lithium occlusion ability is higher and therefore the rate of volumetric expansion at the time of charging is higher; as the oxygen concentration becomes higher, the lithium occlusion ability is lowered, and the rate of volumetric expansion at the time of charging also becomes lower. For example, in the case of silicon oxide ($SiO_x$, $0<x<2$), as its oxygen concentration becomes lower, i.e., the molar ratio x of the oxygen amount relative to its silicon amount becomes smaller, the lithium ion occlusion ability is higher and therefore a higher charge-discharge capacity is obtained, but the rate of volumetric expansion due to charging becomes larger. On the other hand, as the oxygen concentration of silicon oxide becomes higher, i.e., as the aforementioned x becomes larger, the rate of volumetric expansion is reduced, but the charge-discharge capacity is lowered.

In the first region 18 of each negative-electrode active material member 16 of the present embodiment, the oxygen concentration is higher than in the second regions 20, and therefore the rate of volumetric expansion is lower. In the present embodiment, the first region 18 having such a low expansion rate extends from the bottom face of each negative-electrode active material member 16 in a direction away from the surface of the current collector 12, but the second regions 20 which have a lower oxygen concentration, i.e., a higher expansion rate, than does the first region 18 are separated by the first region 18, and therefore the expansion stress occurring in the second regions 20 can be effectively alleviated. The regions of the negative-electrode active material member 16 having a high expansion rate are not only separated along the vertical direction, but also separated along the lateral direction so as to be substantially equal toward the right or left, by the first region 18. Therefore, in the interior of the negative-electrode active material member 16, expansion stress is dispersed with a good balance along the vertical direction and along the lateral direction, which is advantageous because a large difference in the expansion rate is prevented from occurring.

Moreover, the plurality of second regions 20 formed in the interior of each negative-electrode active material member 16 are alternately disposed on the side faces 22A and 22B of the negative-electrode active material member 16, with the first region 18 interposed in between. Therefore, the expansion stresses of the second regions 20 which adjoin each other via the first region 18 run in mutually opposite directions, whereby the stress acting on each entire negative-electrode active material member 16 can be effectively dispersed.

Furthermore, the first region 18 can serve as a backbone for maintaining the shape of the negative-electrode active material member 16, and thus an effect of suppressing vertical cracking in the negative-electrode active material member 16 or peeling and pulverization of only an upper portion of the negative-electrode active material member 16 due to repetitive charging and discharging is also obtained.

Thus, in the present embodiment, while guaranteeing a high charge-discharge capacity with the second regions 20 of each negative-electrode active material member 16, an expansion stress of the second regions 20 can be alleviated with the first region 18, so that deformation of the negative electrode 10 and peeling, cracking, pulverization, etc., of the negative-electrode active material member 16 associated with the expansion stress of the negative-electrode active material can be suppressed. Therefore, by constructing a lithium secondary battery using the negative electrode 10, its charge-discharge cycle characteristics can be improved.

Preferably, the first region 18 includes three or more high-oxygen concentration portions, whereby expansion stress can be alleviated with a greater certainty, so that cracking and pulverization of the negative-electrode active material member 16 can be reduced. Moreover, it is preferable that the regions (second regions) 20 of low oxygen concentration in the respective portions 16a to 16e are separated from one another by the first region 18. Note that, even if the regions of low oxygen concentration that are located in two or more vertically-adjoining portions (e.g., the first portion 16a and the third portion 16c) among the negative-electrode active material member 16 are not completely separated but are jointed in some places, the present invention's effect of alleviating expansion stress can be obtained so long as three or more completely separated regions of low oxygen concentration exist in the negative-electrode active material member 16 as a whole.

Preferably, at least one end of each of the high-oxygen concentration portions 18a to 18e extends to a side face of the negative-electrode active material member 16. As a result, the regions of low oxygen concentration in the negative-electrode active material member 16 can be separated into more regions. If each of the high-oxygen concentration portions 18a to 18e extends from one side face to another side face of the negative-electrode active material member 16, the second regions 20 included in each negative-electrode active material member 16 can be separated from one another, which is advantageous.

Preferably, the bent portions 19 of the first region 18 are located on the opposite side faces 22A and 22B of the negative-electrode active material member 16. As a result, the regions of low oxygen concentration in the negative-electrode active material member 16 can be separated into more regions, whereby an expansion stress due to the regions of low oxygen concentration can be effectively dispersed. Moreover, since the first region 18 is formed across the entire width of each negative-electrode active material member 16, it can function as a backbone with an increased firmness, so that cracking and pulverization of the negative-electrode active material member 16 can be surely suppressed.

As described above, the negative-electrode active material member 16 is preferably formed through a plurality of vapor deposition steps (oblique vapor deposition). In this case, the high-oxygen concentration portions 18a to 18e are each formed in the neighborhood of a portion of the surface of the respective portion 16a to 16e of the negative-electrode active material member 16 that is far from the surface of the current collector 12 (hereinafter may simply be referred to as the "upper face side"), such that an underlying region thereof becomes a second region 20 of low oxygen concentration. Therefore, the first region 18 is formed on the upper face sides of the portions 16a to 16e along the growth directions S. In the second vapor deposition step and later, negative-electrode active material will be deposited on each underlying high-oxygen concentration portion of the portion which was formed in a previous vapor deposition step. As a result, at least parts of the first region 18 are disposed in the neighborhood of the interfaces between vertically-adjoining portions, among the plurality of portions 16a to 16e.

In the present embodiment, the first region 18 is continuous in the interior of the negative-electrode active material member 16. However, even if not all of the high-oxygen concentration portions 18a to 18e continue from one another but some of them are discrete, an expansion-stress alleviating effect similar to the above can still be obtained so long as the interspaces therebetween are sufficiently small (e.g., 1/10 or less of the thickness t of the active material layer 14). Therefore, in the present specification, when it is said that "the first region 18 extends from the bottom face of the negative-electrode active material member 16 in a direction away from the surface of the current collector 12", it is meant to also encompass the case where the first region 18 includes interspaces which are sufficiently small as mentioned above.

Furthermore, because of the process of forming the active material layer 14, "cracking" may occur in the negative-electrode active material member 16, thereby creating discrete places in the first region 18. For example, when the second portion 16b is formed on the first portion 16a by oblique vapor deposition, if a relatively large protrusion occurs on the side face that is located in the upper part of the first portion 16a, the second portion 16b to be grown thereupon may be cracked into plurality along the vertical direction, under the influence of the shadowing effect from that protrusion. Once such cracking occurs, similar cracking will also occur in the third 16c and subsequent portions to be grown thereafter. Even after the negative electrode 10 is completed, "cracking" may occur in the negative-electrode active material member 16 due to repetitive charging and discharging or the like. Unlike a crack which occurs along the vertical direction due to the process of forming the active material layer 14, a crack which occurs due to repetitive charging and discharging may appear in any direction, including the vertical direction and the lateral direction. Even when such cracking has occurred in the negative-electrode active material member 16 due to the process of forming the active material layer 14, repetitive charging and discharging, etc., it can be tolerated so long as the shape of the first region 18, from which the void portion due to the cracking is discounted, extends from the bottom face of the negative-electrode active material member 16 in a direction away from the surface of the current collector 12.

Preferably, the current collector 12 of the present embodiment includes bumps 13 which are regularly arrayed on its surface. The reason is that, particularly in the case where the negative-electrode active material members 16 are formed on the surface of the current collector 12 by utilizing oblique vapor deposition, the layout of the negative-electrode active material members 16 and the size of the voids between negative-electrode active material members 16 can be controlled by appropriately adjusting the shape, size, arraying pitch, etc., of the bumps 13. Therefore, a space for expansion can be secured between adjoining negative-electrode active material members 16 with a greater certainty, and the expansion stress acting at the interfaces between the negative-electrode active material members 16 and the current collector 12 can be alleviated. The method for forming such bumps 13 will be described later. Note that, so long as the current collector 12 includes a plurality of bumps on its surface, it is possible to use as the current collector 12 a metal foil on which bumps of various sizes and shapes are randomly provided, for example. In this case, too, the negative-electrode active material members 16 are formed on the bumps at an interval, so that voids can be obtained between adjoining negative-electrode active material members 16.

As the negative-electrode active material, the active material layer 14 of the present embodiment contains an oxide such as silicon oxide or tin oxide. The active material layer 14 may contain a compound that contains silicon, oxygen, and nitrogen, or may be made of a composite of a plurality of silicon oxides with different ratios between silicon and oxygen. Other than the aforementioned oxide, the active material layer 14 may contain e.g. elemental silicon, a silicon alloy, a compound containing silicon and nitrogen, or the like. Furthermore, the active material layer 14 may contain lithium which has been added to or occluded thereby, or an impurity such as Fe, Al, Ca, Mn, or Ti. Note that, in the case where the active material layer 14 contains silicon oxide as the negative-electrode active material, for example, the active material layer 14 may have a chemical composition represented as SiOx (x:0<x<2) as a whole, and may locally include portions where the oxygen concentration is 0% (e.g., SiOx(x=0)).

In order to attain a high capacity, it is preferable that the active material layer 14 contains silicon. Therefore, the active material layer 14 is preferably made of a compound containing silicon and oxygen. A compound containing silicon and oxygen (silicon oxide) has a composition represented by the general formula SiOx (0<x<2).

In the first region 18 of a negative-electrode active material member 16, preferably, the molar ratio x of the oxygen amount relative to the silicon amount is 0.6 or more but less than 2.0. When x is 0.6 or more, the expansion rate upon charging is reduced, so that the first region 18 can serve as a backbone for maintaining the shape of the negative-electrode active material member 16, and cracking and pulverization of the negative-electrode active material member 16 can be suppressed. The aforementioned x in the first region 18 is more preferably 0.8 or more, and still more preferably 1.0 or more, whereby the expansion stress occurring in the negative-electrode active material member 16 can be dispersed more effectively, and thus higher charge-discharge cycle characteristics can be obtained.

On the other hand, the molar ratio x of the oxygen amount relative to the silicon amount in the second regions 20 is preferably no less than 0 and no more than 0.6. When it is 0.6 or less, a high charge capacity can be ensured without increasing the thickness t of the active material layer 14.

In the case where the molar ratio x of the oxygen amount relative to the silicon amount in the first region 18 is 1.0 or more, the preferable range of Y is as follows, assuming that the first region 18 has a thickness of Y(μm); the total thickness t of active material layer 14 is h(μm); and the number of layers in the negative-electrode active material member 16 is n:

$$(h/n)/10 \leq Y \leq (h/n)/2.$$

When the thickness Y of the high-oxygen concentration region is (h/n)/10 or more, the expansion stress occurring in the interior of the negative-electrode active material member 16 can be effectively alleviated so that pulverization of the negative-electrode active material member 16 is suppressed, whereby the charge-discharge cycle characteristics can be improved. On the other hand, when Y is kept at (h/n)/2 or less, it is possible to secure sufficient regions having a high lithium occlusion ability with an oxygen concentration of 1.0 or less, whereby a high charge capacity is obtained.

Preferably, the thickness t of the active material layer 14 of the present embodiment is e.g. no less than 5 μm and no more than 100 μm, and more preferably no less than 5 μm and no more than 50 μm. As used herein, "the thickness of the active material layer 14" means the thickness of the active material layer 14 from the upper face or apex of the bump 13 of the current collector 12, taken along the normal direction N of the current collector 12, and is equal to an average thickness of the plurality of negative-electrode active material members 16. When the thickness of the active material layer 14 is 5 μm or more, a sufficient energy density can be ensured. In particular, when silicon oxide is used as the negative-electrode active material, it is possible to take advantage of the high capacity characteristics of silicon oxide. If the thickness of the active material layer 14 exceeds 100 μm, not only will it become difficult to form the active material layer 14, but also the aspect ratio of the negative-electrode active material members 16 will be large, so that breaking or the like of the negative-electrode active material members 16 will be likely to occur, causing deteriorations in characteristics.

Moreover, it is preferable that the respective thicknesses $t_a$ to $t_e$ of the portions 16a to 16e included in each negative-electrode active material member 16 are no less than 0.2 μm and no more than 10 μm. If the thicknesses $t_a$ to $t_e$ are less than 0.2 μm, the thickness of each high-oxygen concentration portion 18a to 18e will be small, thus making it difficult to sufficiently alleviate expansion stress. On the other hand, if they are larger than 10 μm, each second region 20 of low oxygen concentration will have an excessive volume, so that the expansion stress occurring in the second regions 20 will become large, thus making it difficult to sufficiently alleviate the expansion stress. More preferably, they are 4 μm or less so that finer separation between the regions of low oxygen concentration can be obtained with the first region 18, whereby the expansion stress can be effectively dispersed. Note that, as will be described later, the five portions 16a to 16e are formed through first to fifth vapor deposition steps, so that the thicknesses $t_a$ to $t_e$ can be controlled based on the vapor deposition time, vapor deposition rate, and the like in each vapor deposition step.

Furthermore, in the present embodiment, each negative-electrode active material member 16 has a so-called zigzag shape which is tilted in different directions according to its growth directions S. Such a structure can be confirmed by performing a chemical etching for a polished cross section which is perpendicular to the surface of the current collector 12 and which contains the growth directions S and observing the resultant specimen, for example. In the case where the negative-electrode active material member 16 has a zigzag shape, other than the plurality of portions being divided based on the changing growth directions S as shown in FIG. 1(a), it is possible to divide the negative-electrode active material member 16 into a plurality of layers based on their tilting directions.

Figure 2:
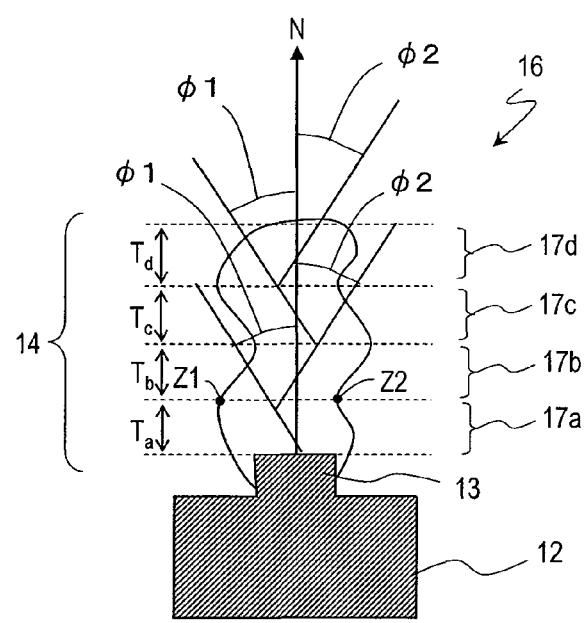
FIG. 2 A schematic cross-sectional view illustrating an exemplary negative-electrode active material member which is formed through four vapor deposition steps, resulting in four layers based on tilting directions.

FIG. 2 is a schematic cross-sectional view illustrating an exemplary negative-electrode active material member 16 which is formed through four vapor deposition steps. In this example, based on a plane that contains points Z1 and Z2 at which the tilting direction of the respective side faces of the negative-electrode active material member 16 changes, a first layer 17a, which is the lowermost layer, and the second layer 17b are divided. In this manner, the negative-electrode active material member 16 can be divided into the four layers of first layer 17a to fourth layer 17d. In the illustrated example, the first layer 17a and the third layer 17c are tilted at an angle φ1 from the normal direction N of the current collector 12, and the second layer 17b and the fourth layer 17d are tilted at an angle φ2 from the normal direction N of the current collector 12. Thus, layers having tilting angles of the angle φ1 and the angle φ2 are alternately stacked. The illustrated negative-electrode active material member 16 can be said to have a "construction with a number of layers n=4". In the case where each negative-electrode active material member 16 is divided into a plurality of portions depending on the changing growth directions S, the "number of layers n" as used herein is equal to the number of such portions, i.e., the number of vapor deposition steps in the production process described below.

In the example shown in FIG. 2, the angles φ1 and φ2 have different tilting directions from the normal direction N, but are equal in magnitude (φ1=−φ2). In such a case, it is preferable that the thicknesses $T_a$ to $T_d$ of the respective layers 17a to 17d are no less than 0.1 μm and no more than 5 μm. As a result, expansion stress can be sufficiently alleviated, and deteriorations in characteristics due to expansion stress can be suppressed. More preferably, the thicknesses $T_a$ to $T_d$ are no less than 0.1 μm and no more than 2 μm, whereby expansion stress can be alleviated more effectively. Note that the tilting angles φ1 and φ2 of the layers 17a to 17d may be different in magnitude.

Moreover, the number n of layers composing each negative-electrode active material member 16 is preferably three or more. If it is two or less, the expansion of the negative-electrode active material member 16 along the width direction (lateral direction) may not be sufficiently suppressed. The upper limit of the preferable range of the number of layers n can be calculated so as to satisfy the preferable thickness t of the active material layer 14 and the aforementioned preferable thicknesses $T_a$ to $T_d$ of the respective layers composing the negative-electrode active material member 16, e.g. fifty (100 μm/2 μm). Therefore, when forming the active material layer 14, it is preferable to perform at least first to third vapor deposition steps while switching the vapor vaporation directions.

Note that the shape and construction of each negative-electrode active material member 16 of the present embodiment are not limited to the shapes and constructions shown in FIG. 1 and FIG. 2.

Figure 3:
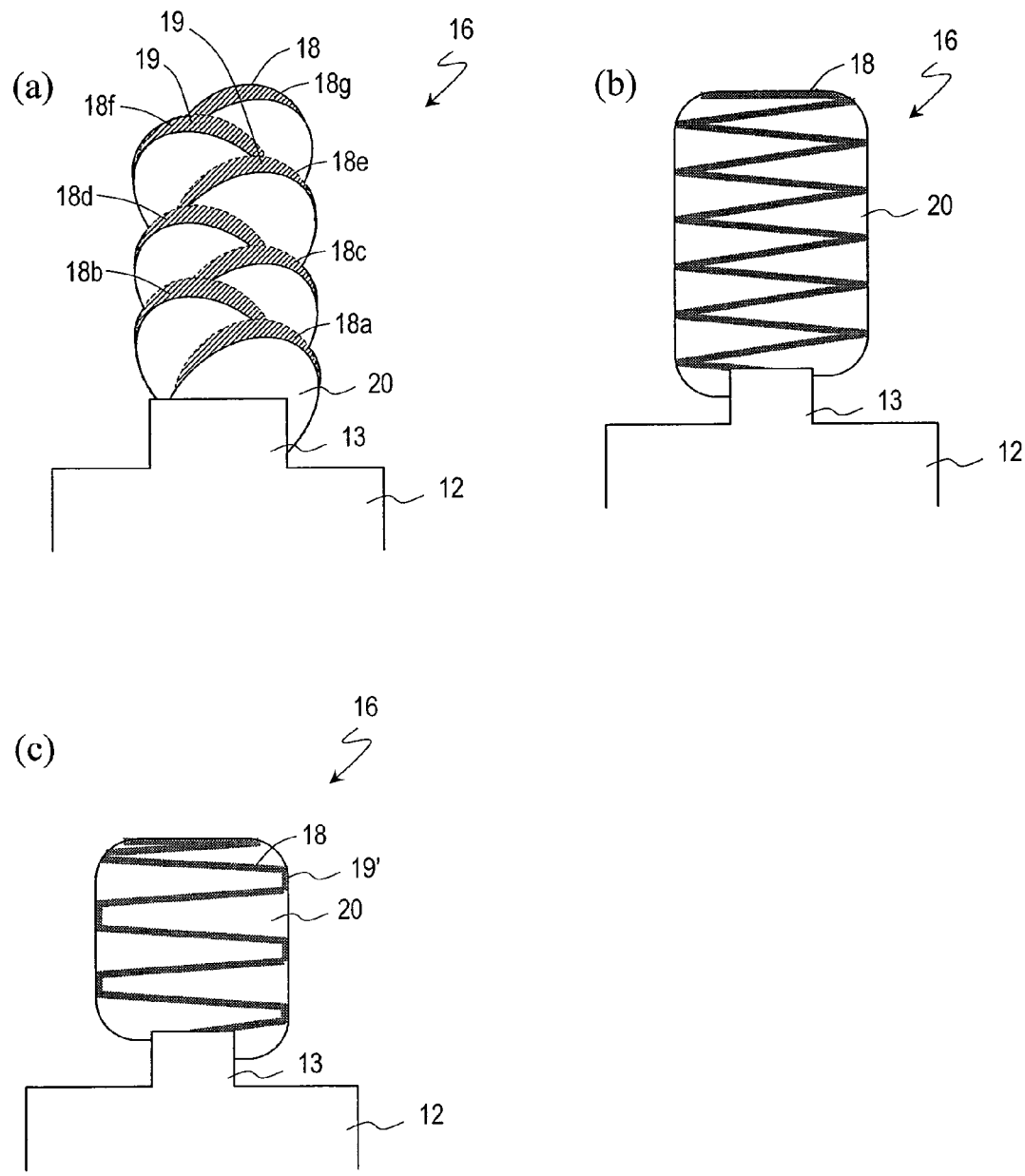
FIG. 3 (a) to (c) are schematic cross-sectional views showing other constructions of the negative-electrode active material member according to an embodiment of the present invention.

It suffices if the first region 18 of the negative-electrode active material member 16 includes high-oxygen concentration portions 18a to 18g which are tilted alternately in opposite directions with respect to the normal direction N of the current collector 12, as shown in FIG. 3(a). For example, adjoining high-oxygen concentration portions may not be in contact with one another at their ends, such that the bent portions 19 are not disposed on the side faces of the negative-electrode active material member 16. In this case, too, the regions of low oxygen concentration of the negative-electrode active material member 16 are separated into a plurality of regions by the first region 18, whereby the expansion stress occurring in the negative-electrode active material member 16 is prevented from concentrating on one side face.

In the cases where, when forming the negative-electrode active material member 16, a large number (e.g. 30 or more) of vapor deposition steps are performed while switching the evaporation direction, or the thicknesses $t_a$ to $t_e$ of the portions 16a to 16e formed through the respective vapor deposition steps are particularly small (e.g. 0.5 μm or less), a cross-sectional shape of the negative-electrode active material member 16 may not be a zigzag shape which is tilted along the growth directions S, but may be a pillar shape which stands upright along the normal direction N of the current collector 12, as shown in FIG. 3(b), for example. Even in such cases, irrespective of the cross-sectional shape of the negative-electrode active material member 16, a first region 18 which extends from the bottom face of the negative-electrode active material member 16 in a zigzag manner in a direction away from the surface of the current collector 12 is formed in the interior of the negative-electrode active material member 16, whereby the aforementioned expansion stress alleviation effect can be obtained.

Furthermore, the first region 18 may have bent portions 19' in the "⊐" shape. For example, as shown in FIG. 3(c), it may have a plurality of high-oxygen concentration portions which are formed across the width of the negative-electrode active material member 16, such that these high-oxygen concentration portions are connected by shaped bent portions 19' which are alternately formed on the side faces of the negative-electrode active material member 16. In this case, the plurality of high-oxygen concentration portions may be substantially parallel to the surface of the current collector 12. In such a construction, too, deformation of the negative-electrode active material member 16 along the vertical direction and along the lateral direction can be suppressed with the first region 18, whereby the shape of the negative-electrode active material member 16 is maintained.

Note that the "zigzag shape" as used in the present specification encompasses the shapes for the first region 18 described with reference to FIG. 3(a) to FIG. 3(c).

Although not shown, in addition to the first region 18, the negative-electrode active material member 16 according to the present invention may include a region or layer of relatively high oxygen concentration in the neighborhood of the surface of the negative-electrode active material member 16. For example, a coating layer of silicon dioxide may be provided on the surface of the negative-electrode active material member 16, thus making it possible to suppress a decomposition reaction of the electrolyte solution due to the negative-electrode active material. A method of forming such a coating layer and the effects thereof are described in the pamphlet of International Publication No. 2007/086411 and U.S. patent application Ser. No. 12/089,046 by the Applicants. The entire disclosures of the pamphlet of International Publication No. 2007/086411 and U.S. patent application Ser. No. 12/089,046 are incorporated into the present specification by reference.

Between the current collector 12 and the negative-electrode active material member 16, a continuous film (spread film) of an active material such as silicon oxide film may be formed. As a result, peeling of the negative-electrode active material member 16 from the current collector 12 can be effectively suppressed. A method of forming such a continuous film and the effects thereof are described in the pamphlet of International Publication No. 2007/094311, U.S. patent application Ser. No. 11/994,562, and undisclosed International Patent Application PCT/JP2008/000564 by the Applicants, for example. The entire disclosures of the pamphlet of International Publication No. 2007/094311, U.S. patent application Ser. No. 11/994,562, and International Patent Application PCT/JP2008/000564 are incorporated into the present specification by reference.

Next, with reference to the drawings, an exemplary method of producing the negative electrode 10 of the present embodiment will be described.

First, a ruggedness pattern is formed on the surface of the metal foil, thereby producing a current collector 12 having a plurality of bumps 13 on the surface. The current collector 12 may be produced by providing a predetermined pattern of grooves on the surface of a metal foil (Cu foil) by using cutting technique, for example, or produced by forming a plurality of bumps 13 on the surface of a metal foil by plating technique or transfer technique. The preferable ranges of the shape, height, arraying pitch, etc., of the bumps 13 will be described later. Note that a commercially-available metal foil having a large surface roughness (rugged foil) may be used as the current collector 12.

Next, on the surface of the current collector 12, silicon oxide ($SiO_x(0<x<2)$) is grown as the negative-electrode active material by oblique vapor deposition, thus forming a plurality of negative-electrode active material members 16.

FIGS. 4(a) and (b) are diagrams illustrating exemplary constructions of a vapor deposition apparatus employed when forming the negative-electrode active material members 16, being schematic cross-sectional views as viewed from directions which are 90° apart.

The vapor deposition apparatus 30 includes a chamber 32 and an evacuation pump (not shown) for evacuating the chamber 32. In the interior of the chamber 32, a stage 33 on which to fix the current collector 12, tubes 35a and 35b for introducing an oxygen gas into the chamber 32, nozzles 34a and 34b respectively connected to the tubes 35a and 35b for emitting an oxygen gas, and a evaporation source 36 for supplying silicon onto the surface of the current collector 12 are provided. Although not shown, the tubes 35a and 35b are connected to an oxygen cylinder via a switch valve and a mass flow controller. The evaporation source 36 are disposed vertically below the stage 33. In the present embodiment, elemental silicon is used as the evaporation source 36. Although not shown, an electron beam heating means for evaporating the material of the evaporation source 36 is provided.

The stage 33 has a rotation axis (not shown), and as the stage 33 is rotated around this rotation axis, an angle (tilting angle) θ of the stage 33 with respect to the horizontal plane 39 can be adjusted. Herein, the "horizontal plane" refers to a plane which is perpendicular to the direction in which material of the evaporation source 36 is vaporized to travel toward the stage 33. The nozzles 34a and 34b for emitting oxygen are disposed on both sides of the stage 33 so as to be symmetric with respect to the direction in which the material of the evaporation source 36 is vaporized to travel toward the stage 33.

First, the current collector 12 is placed on the stage 33 so that its face having the plurality of bumps 13 formed thereon is upward, and the stage 33 is rotated until fixed at a position where the tilting angle θ of the stage 33 with respect to the horizontal plane 39 is greater than 0° and less than 90° (e.g. θ=60°, as shown in FIG. 4(b). Note that the incident direction E of silicon with respect to the normal direction N of the current collector 12 (i.e., evaporation direction) can be adjusted based on the tilting direction of the stage 33 from the horizontal plane 39, and the absolute value of the tilting angle θ is equal to the angle (incident angle of silicon) α between the incident direction E of silicon with respect to the current collector 12 placed on the stage 33 and the normal direction N of the current collector 12. Therefore, by adjusting the tilting angle θ of the stage 33, the growth direction of the negative-electrode active material member 16 to be grown on the surface of the current collector 12 can be controlled.

In this state, while supplying a high-purity oxygen gas onto the surface of the current collector 12 through the nozzle 34a, the evaporation source 36 is irradiated with an electron beam, thus allowing silicon to strike the surface of the current collector 12 at an incident angle α (e.g., 60°). Together with the oxygen gas released from the nozzle 34a, the vapor of elemental silicon from the evaporation source 36 is supplied onto the surface of the current collector 12 placed on the stage 33, whereby a compound containing silicon and oxygen (silicon oxide) grows on the surface of the current collector 12 via reactive evaporation (first vapor deposition step).

At this time, the silicon atoms emitted from the evaporation source 36 strike the surface of the current collector 12 from a direction which is tilted from the normal direction N of the current collector 12, and therefore are easy to be vapor-deposited on the bumps 13 on the surface of the current collector 12. Thus, silicon oxide grows in pillar shapes on the bumps 13. As a result, on the surface of the current collector 12, regions are created which are shaded by the bumps 13 and the silicon oxide growing in pillar shapes, such that Si atoms do not strike these regions and silicon oxide is not vapor-deposited there (shadowing effect). In the illustrated example, because of this shadowing effect, Si atoms do not adhere on the grooves between adjoining bumps 13 and silicon oxide does not grow there.

Figure 5:
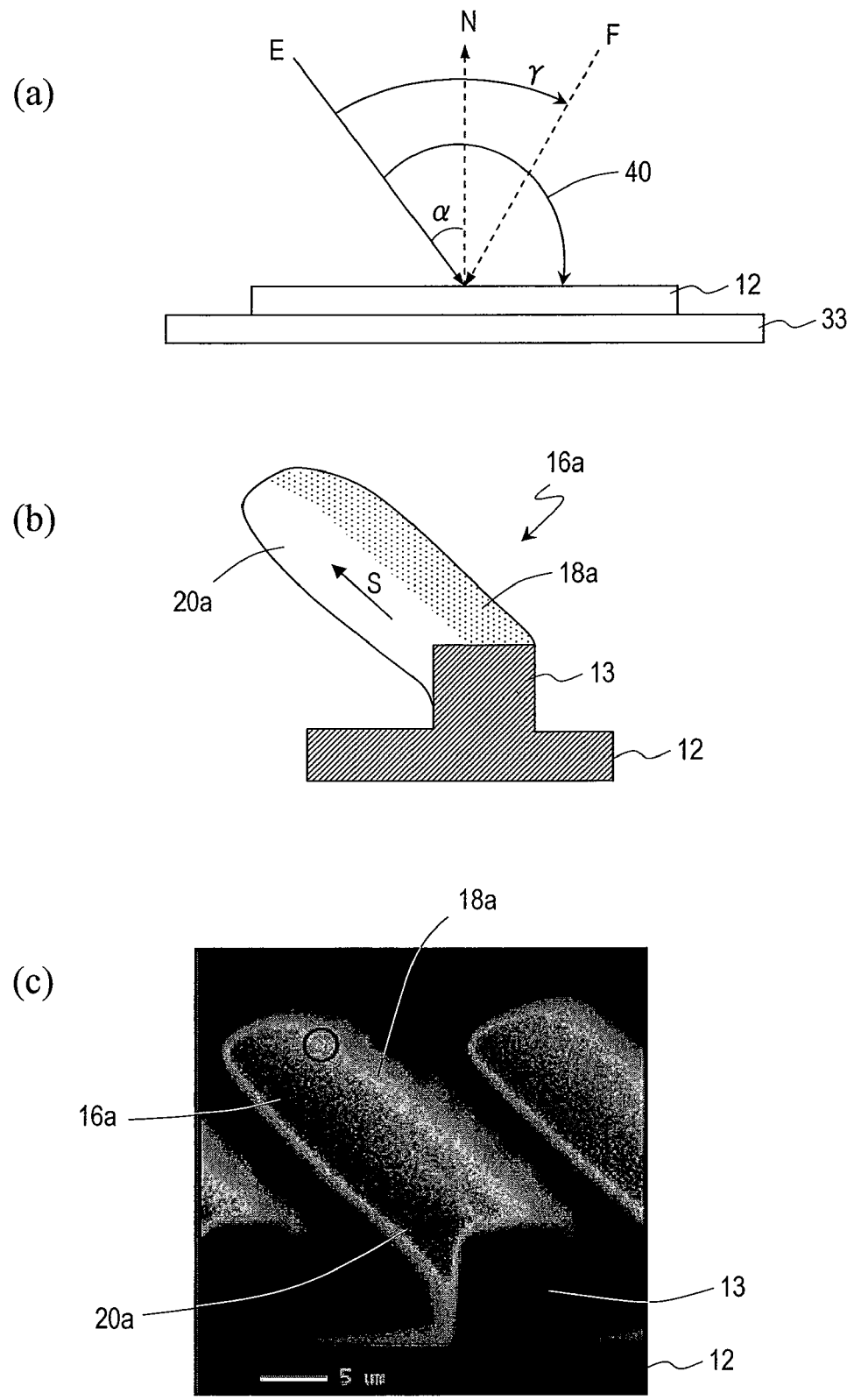
FIG. 5 (a) is a diagram for describing a preferable relationship between the incident direction of silicon with respect to the surface of a current collector and the supply direction of oxygen, in a first vapor deposition step for forming an active material layer; (b) is a schematic diagram illustrating the construction of a first portion (a portion of a negative-electrode active material member that is the closest to the current collector) as obtained through the first vapor deposition step; and (c) is a diagram illustrating an exemplary oxygen mapping of a negative-electrode active material member as obtained through the first vapor deposition step.

In this step, as shown in FIG. 5(a), assuming that the angle between the incident direction E of silicon and the normal direction N of the current collector 12 is α (0°<α<90°, in a plane which contains the incident direction E and which is perpendicular to the surface of the current collector 12, the oxygen gas released from the nozzle 34a is supplied onto the surface of the current collector 12 from a direction indicated by a range 40, i.e., a direction F that constitutes an angle γ which is greater than 0° but less than (90°+α) from the incident direction E of silicon toward the normal direction N of the current collector 12. The supply direction of the oxygen gas can be appropriately adjusted based on the position and outgoing angle of the nozzle 34a. Note that the oxygen gas is preferably supplied onto the surface of the current collector 12 from a direction which is tilted with respect to the normal direction N of the current collector 12 toward the opposite side of the incident direction E of silicon (α≦γ≦(90°+α)). As a result of this, the region 18a of high oxygen concentration can be disposed on the upper face side of the first portion 16a with a greater certainty.

Through the first vapor deposition step, as schematically shown in FIG. 5(b), the first portion 16a having a growth direction S which is tilted with respect to the normal direction N of the current collector 12 is formed on a bump 13 of the current collector 12. In the first portion 16a, a region of relatively high oxygen concentration (first region) 18a is formed on the upper face side, such that the region of the first portion 16a other than the first region 18a defines a second region 20a having an oxygen concentration which is lower than that of the first region 18a.

Although FIG. 5(b) and FIG. 5(c) described later illustrate the first portion 16a as being long along the vertical direction and having a large aspect ratio in order to clearly explain the construction and oxygen distribution of the first portion 16a, the thickness of the first portion 16a of the present embodiment is smaller than the illustrated thickness.

FIG. 5(c) is a diagram illustrating an exemplary oxygen mapping of a cross section of the first portion 16a. The illustrated oxygen mapping is a monochrome photocopy of a color image of a cross section of the first portion 16a obtained via x-ray microanalyzer (EPMA) measurement, where the concentration distribution of each element is represented in lightness. As can be seen from this figure, the first portion 16a has opposing side faces in a cross section which is perpendicular to the surface of the current collector 12; among these, along the side face which is farther away from the surface of the current collector 12 (hereinafter also referred to as the "upper side face"), a region of high lightness, i.e., the first region 18a of a relatively high oxygen concentration, is formed. In the neighborhood of the side face which is closer to the surface of the current collector 12 (hereinafter also referred to as the "lower side face"), a region of low lightness (dark), i.e., the second region 20a of low oxygen concentration, is formed.

Next, the stage 33 is rotated clockwise around the rotation axis and is allowed to tilt with respect to the horizontal plane 39, in a direction opposite to the tilting direction of the stage 33 in the aforementioned first vapor deposition step. The tilting angle θ is greater than −90° and less than 0° (e.g. θ=−60°. At the same time, the nozzle for supplying the oxygen gas is changed from the nozzle 34a to the nozzle 34b, thereby switching the supply direction of the oxygen gas.

In this state, while supplying a high-purity oxygen gas onto the surface of the current collector 12 through the nozzle 34b, the evaporation source 36 is irradiated with an electron beam, thus allowing silicon to strike the surface of the current collector 12 at an incident angle θ (θ: e.g. −60°. At this time, due to the aforementioned shadowing effect, silicon atoms selectively strike upon the first portion 16a formed on the current collector 12, so that silicon oxide further grows on the first portion 16a (second vapor deposition step). Note that the silicon oxide is disposed on the upper side face of the first portion 16a due to the shadowing effect, and therefore grows on the underlying first region 18 of the first portion 16a.

Figure 6:
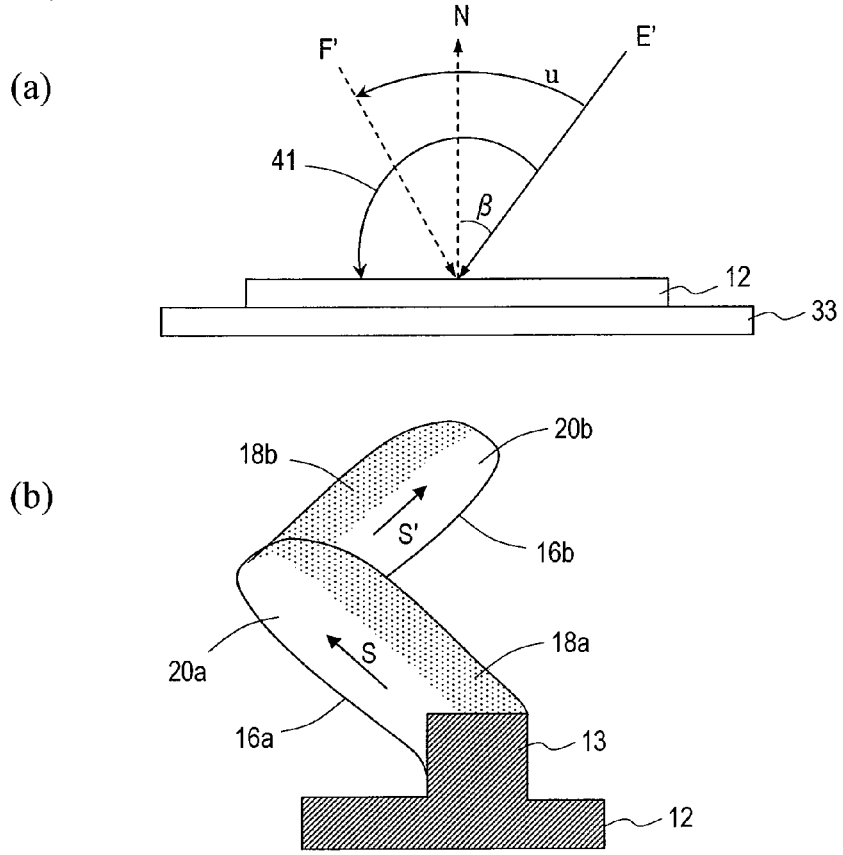
FIG. 6 (a) is a diagram for describing a preferable relationship between the incident direction of silicon with respect to the surface of a current collector and the supply direction of oxygen, in a second vapor deposition step for forming an active material layer; and (b) is a schematic diagram illustrating an exemplary construction of first and second portions of a negative-electrode active material member after the second vapor deposition step.

In this step, too, as shown in FIG. 6(a), assuming that the angle between the incident direction E' of silicon and the normal direction N of the current collector 12 is β (0°<β<90°), in a plane which contains the incident direction E' and which is perpendicular to the surface of the current collector 12, the oxygen gas released from the nozzle 34b is supplied onto the surface of the current collector 12 from a direction indicated by a range 41, i.e., a direction F' that constitutes an angle u which is greater than 0° and less than (90°+β) from the incident direction E' of silicon toward the normal direction N of the current collector 12. The supply direction of the oxygen gas can be appropriately adjusted based on the position and outgoing angle of the nozzle 34b. Note that the oxygen gas is preferably supplied onto the surface of the current collector 12 form a direction which is tilted with respect to the normal direction N of the current collector 12 toward the opposite side of the incident direction E' of silicon (β<u<(90°+β)). As a result of this, the region 18b of high oxygen concentration can be disposed on the upper face side of the third portion 16b with a greater certainty.

Through the second vapor deposition step, as shown in FIG. 6(b), the second portion 16b having a growth direction S' which is tilted with respect to the normal direction N of the current collector 12 is formed on the first portion 16a. The growth direction S' is different from the growth direction S of the first portion 16a. Moreover, the region of relatively high oxygen concentration (first region) 18b is formed on the upper face side of the second portion 16b, such that the region of the second portion 16b other than the first region 18b defines a second region 20b having an oxygen concentration which is lower than that of the first region 18b. Moreover, the first region 18b of the second portion 16b is formed so as to be in contact with the first region 18a of the first portion 16a. In FIG. 6(b), too, as in FIG. 5(b) described above, the thicknesses of the portions 16a and 16b are illustrated as being greater than the thicknesses of the portions 16a and 16b in the present embodiment in order to clearly explain the constructions and oxygen distributions of the first and second portions 16a and 16b.

Thereafter, the tilting angle of the stage 33 is again set to the same angle as in the first vapor deposition step (θ: e.g. 60°), and the nozzle switching is performed so that the oxygen gas is emitted from the nozzle 34a, and silicon oxide is grown under conditions similar to those in the first vapor deposition step (third vapor deposition step). As a result, the third portion 16c is further formed on the second portion 16b.

In this manner, the tilting angle θ of the stage 33 is alternately switched between 60° and −60°, for example, and the nozzle to be used is alternately switched in synchronization therewith, thus performing up to e.g. fifth vapor deposition, whereby the negative-electrode active material member 16 having five the portions 16a to 16e can be formed as shown in FIG. 1. Although there is no particular limitation as to the vapor deposition time in each vapor deposition step, they are preferably set substantially equal. Therefore, in the present embodiment, they are preferably set to be ⅕ of the total vapor deposition time.

According to the aforementioned production method, when forming the negative-electrode active material member 16 by performing a plurality of vapor deposition steps, for each vapor deposition step, the oxygen concentration distribution of silicon oxide to be obtained through that vapor deposition step can be controlled by adjusting the incident angle of silicon and the angle at which to supply the oxygen gas with respect to the surface of the current collector 12. Thus, a negative-electrode active material member 16 having an oxygen concentration distribution such that a region of high oxygen concentration (first region) 18 extends in a zigzag manner from the bottom face to the upper face is obtained.

In the above method, an oxygen nozzle switching is performed when changing the tilting direction of the stage 33. For comparison, negative-electrode active material members as described below will be formed if oxygen is supplied by only using the same nozzle 34a through all of the first to fifth vapor deposition steps by employing the vapor deposition apparatus 30.

Figure 7:
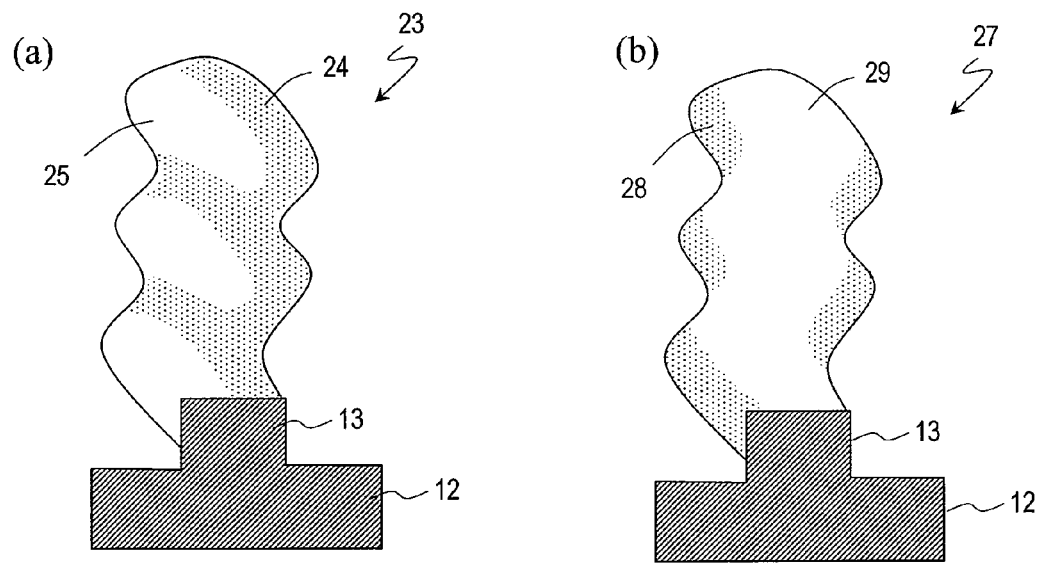
FIGS. 7 (a) and (b) are diagrams schematically showing oxygen concentration distributions in a negative-electrode active material member, respectively, in the case where oxygen is supplied through only the same nozzle in all vapor deposition steps and in the case where oxygen is supplied through a nozzle different from that of an embodiment of the present invention in every vapor deposition step, where a production apparatus similar to that of an embodiment of the present invention is employed.

FIG. 7(a) is a cross-sectional view schematically showing a negative-electrode active material member which is formed by a method similar to the above method except that oxygen is supplied by only using the same nozzle 34a in all of the first to fifth vapor deposition steps.

The negative-electrode active material member 23 includes a region 24 of high oxygen concentration and a plurality of regions 25 having an oxygen concentration which is lower than that of the region 24. In the negative-electrode active material member 23, too, the region having a low oxygen concentration, i.e., a high expansion rate are separated into a plurality of regions 25 by the region 24 of high oxygen concentration. These regions 25 are only disposed on one side of the region 24 (only on the left-hand side in FIG. 7(a)), and is not disposed on the other side (right-hand side in FIG. 7(a)). Thus, since the regions 25 of low oxygen concentration are disposed so as to be solely on one side face portion of the negative-electrode active material member 23, a significant oxygen concentration distribution along the lateral direction occurs in the negative-electrode active material member 23.

The reason why such an oxygen concentration distribution occurs will be briefly described. In this example, in the first, third, and fifth vapor deposition steps, the incident direction of silicon and the supply direction of oxygen satisfy the relationship which has been described with reference to FIG. 5, so that silicon oxide having a region of high oxygen concentration can be grown on the upper face side. However, in the second and fourth vapor deposition steps, oxygen is supplied from a direction that is tilted toward the same side as the incident direction of silicon with respect to the normal direction N of the current collector 12, at an angle which is equal to or greater than the incident angle β of silicon. As a result, a piece of silicon oxide grows which has a region of high oxygen concentration on the lower face side. As a result, the region 24 of high oxygen concentration is formed on the entire right side face of the negative-electrode active material member 23.

In the negative-electrode active material member 23, layers of the region 24 of high oxygen concentration are also formed in the interior of the negative-electrode active material member 23 through the first, third, and fifth vapor deposition steps, so that expansion stress can be dispersed along the vertical direction of the negative-electrode active material member 23. However, since the region 24 of high oxygen concentration and the regions 25 of low oxygen concentration are not disposed so as to be substantially equal toward the right or left, there are large differences in expansion rate along the lateral direction, and thus expansion stress cannot be sufficiently alleviated. Specifically, in the illustrated cross section, the proportion of the regions 25 of low oxygen concentration is high on the left-hand side, so that expansion stress is likely to concentrate in the left side face portion, possibly causing peeling, cracking, pulverization, and the like of the negative-electrode active material member 23. Furthermore, in the illustrated cross section, the expansion rate is higher at the left side face portion of the negative-electrode active material member 23 than at the right side face portion, thus leading to a problem in that the negative-electrode active material member 23 may be tilted toward the right due to repetitive charging and discharging.

In contrast, according to the method of the present embodiment, as shown in FIG. 1(b), the second regions 20 having a low oxygen concentration, i.e., a high expansion rate, can be alternately disposed on both sides of the first region 18 of high oxygen concentration, so that the expansion stress occurring in the negative-electrode active material member 16 can be dispersed along the vertical direction and along the lateral direction. Moreover, since the proportions of the second regions 20 at the right and left side face portions of the negative-electrode active material member 16 can be made substantially equal, when a secondary battery is constructed by using this negative electrode and repeatedly subjected to charging and discharging, the negative-electrode active material member 16 will maintain a state of standing upright, without tilting to one side.

On the other hand, for further comparison, negative-electrode active material members as described below will be formed if oxygen is supplied through the nozzle different from the nozzle used in the method of the present embodiment in every one of the first to fifth vapor deposition steps, by using the vapor deposition apparatus 30.

FIG. 7(b) is a cross-sectional view schematically showing a negative-electrode active material member which is formed by a method similar to the method of the present embodiment except that oxygen is supplied by using the nozzle 34b in the first, third, and fifth vapor deposition steps, and using the nozzle 34a in the second and fourth vapor deposition steps.

The negative-electrode active material member 27 includes a region 29 of low oxygen concentration and a plurality of regions 28 of high oxygen concentration. The region 29 of low oxygen concentration is continuously formed from the bottom face of the negative-electrode active material member 27 in a direction away from the surface of the current collector 12. The plurality of regions 28 of high oxygen concentration are alternately disposed on opposing side faces of the negative-electrode active material member 27 in the illustrated cross section.

The reason why such an oxygen concentration distribution occurs will be briefly described. In this example, in all of the first to fifth vapor deposition steps, oxygen is supplied from a direction that is tilted toward the same side as the incident direction of silicon with respect to the normal direction N of the current collector 12, at an angle which is equal to or greater than the incident angle of silicon, and thus silicon oxide having a high oxygen concentration on the lower face side grows. As a result, a plurality of regions 28 of high oxygen concentration are formed along the portions of the side faces of the negative-electrode active material member 27 that are tilted downward, and not in the central portion of the negative-electrode active material member 27.

Thus, in the negative-electrode active material member 27, the region 29 of low oxygen concentration is not separated by the regions 28 of high oxygen concentration, so that the expansion stress occurring in the region 29 cannot be dispersed. Moreover, the regions 28 of high oxygen concentration do not extend from the bottom face of the negative-electrode active material member 27 in a direction away from the surface of the current collector 12, and therefore cannot sufficiently serve to maintain the shape of the negative-electrode active material member 27. Therefore, the expansion stress occurring in the negative-electrode active material member 27 cannot be sufficiently alleviated with the regions 28 of high oxygen concentration, and it is difficult to suppress deterioration of the charge-discharge cycle characteristics.

Note that, it might be possible to provide a region of high oxygen concentration in an active material member which is tilted in one direction with respect to the normal direction of the current collector, as proposed in Patent Document 2, with a view to alleviating expansion stress. However, in such a negative-electrode active material member, it is difficult to provide a region of high oxygen concentration that has a shape which separates the region of low oxygen concentration into a plurality, and expansion stress cannot be sufficiently alleviated, as will be described below.

When trying to provide a region of high oxygen concentration in a negative-electrode active material member which is tilted in one direction, as shown in FIG. 5(c) above, for example, a region of high oxygen concentration can be formed along the upper side face of the negative-electrode active material member, or conversely a region of high oxygen concentration can be formed along the lower side face, based on the supply direction of oxygen. However, even if a region of high oxygen concentration is formed only on one side face, there are large differences in expansion rate along the lateral direction of the negative-electrode active material member, and expansion stress cannot be sufficiently dispersed. Moreover, since a region having a low oxygen concentration, i.e., a high expansion rate, exists along the entire height of the negative-electrode active material member, the amount of expansion of the negative-electrode active material member is also large. Therefore, a large expansion stress occurs in the interior of the negative-electrode active material member, possibly causing peeling, cracking, pulverization, etc., of the negative-electrode active material member.

Furthermore, by performing vapor deposition while varying the supply amount of oxygen, it might be possible to alternately provide layers of high oxygen concentration and layers of low oxygen concentration in a negative-electrode active material member which is tilted in one direction, for example. However, in this case, too, a plurality of layers of high oxygen concentration are disposed in parallel arrangement without being linked together, and therefore they cannot function as a backbone for maintaining the shape of the negative-electrode active material member. Therefore, the effect of suppressing cracking and pulverization due to repetitive charging and discharging cannot be obtained. Moreover, when cracking occurs in a layer of low oxygen concentration, pillar-like particles will be destroyed at this portion, thus becoming a cause for deteriorations in characteristics, e.g., lowered capacity.

Thus, with a negative-electrode active material member which is tilted in one direction, the oxygen concentration of the negative-electrode active material member might be locally enhanced, but it is not possible to obtain a structure having a high effect of alleviating expansion stress as is realized by the first region 18 of the present embodiment.

The method of forming the active material layer 14 of the present embodiment is not limited to the method described above with reference to FIG. 4 to FIG. 6. For example, in each vapor deposition step, the stage 33 may be allowed to rotate in the opposite manner from the present embodiment, thus inverting the tilting directions of the negative-electrode active material member 16. In that case, in the cross-sectional view shown in FIG. 6, a second portion 16b that is tilted in the left direction will be formed in a first portion 16a that is tilted in the right direction. Note that the tilting directions of the portions 16a to 16e of the negative-electrode active material member 16 and the tilting directions of the high-oxygen concentration portions 18a to 18e in the first region 18 can be confirmed by observing a plane which is perpendicular to the current collector 12 and which contains the evaporation directions (growth directions), but the right and left will be reversed depending on the direction of observing this plane, and hence are not particular limitations.

In the present embodiment, when forming the negative-electrode active material member 16 by performing a plurality of vapor deposition steps, for each vapor deposition step, the oxygen concentration distribution of silicon oxide to be obtained through that vapor deposition step is controlled by adjusting the incident angle of silicon and the angle at which to supply the oxygen gas with respect to the surface of the current collector 12; so long as this is attained, the construction of the vapor deposition apparatus and the layouts and numbers of the oxygen nozzles and evaporation sources may be selected as appropriate.

For example, in the vapor deposition apparatus 30 described with reference to FIGS. 4(a) and (b), the relative positioning between the current collector 12 and the evaporation source 36 is changed by rotating the stage 33 with respect to the direction in which silicon is emitted from the evaporation source 36. However, the angle of the stage 33 may be fixed, and the relative positioning between the current collector 12 and the evaporation source 36 may be changed by employing a plurality of evaporation sources having different incident angles of silicon with respect to the current collector 12 on the stage 33.

Figure 8:
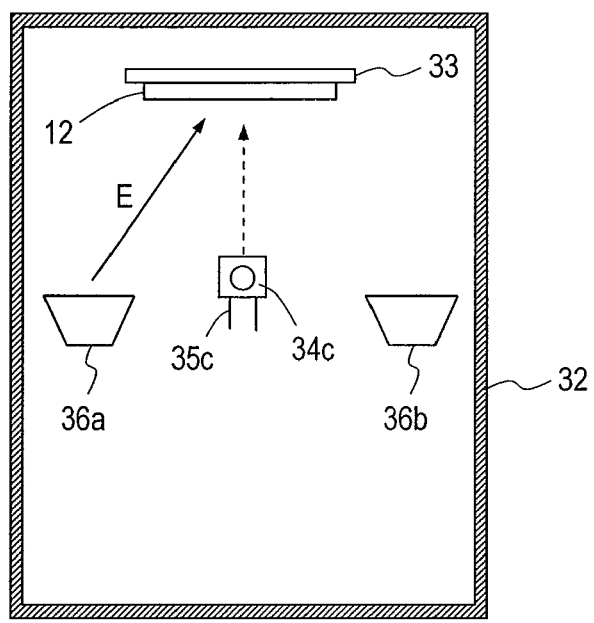
FIGS. 8 (a) and (b) are schematic cross-sectional views illustrating other constructions of a vapor deposition apparatus to be employed in an embodiment of the present invention.
Figure 8:
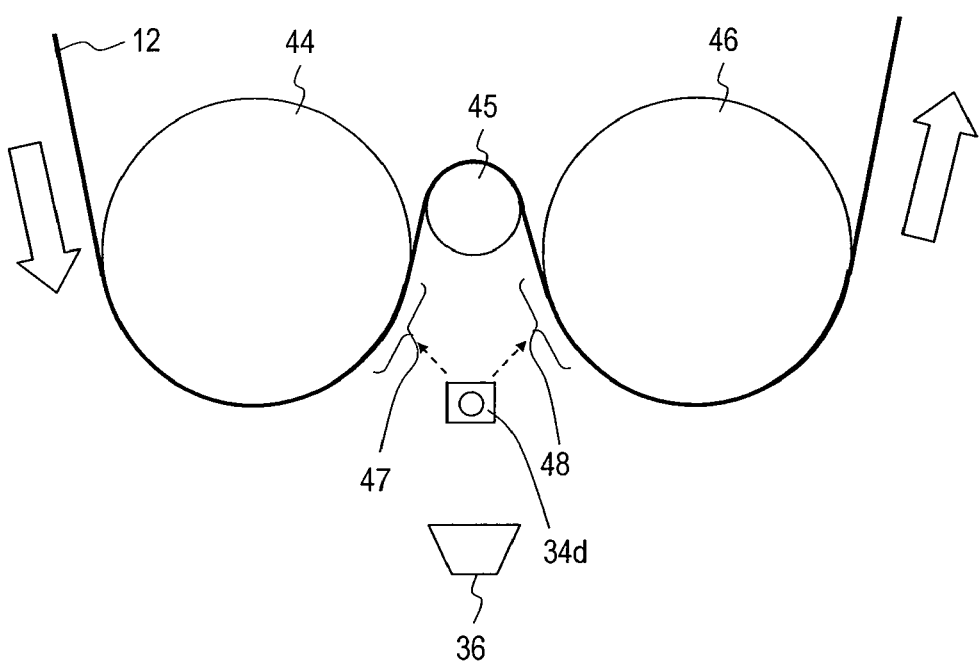

FIG. 8(a) is a schematic cross-sectional view showing the construction of a vapor deposition apparatus having two evaporation sources. This vapor deposition apparatus includes a stage 33 which is placed in the horizontal direction in the interior of the chamber 32, and a single tube 35c and a single nozzle 34c for supplying oxygen gas disposed under it, and two evaporation sources 36a and 36b disposed on opposite sides of the normal direction N of the current collector 12. With such a vapor deposition apparatus, by alternately switching between the evaporation sources 36a and 36b, the incident direction of silicon with respect to the current collector 12 placed on the stage 33 can be changed. Moreover, by setting the position and emission direction of the nozzle 34c so that the oxygen gas emitted from the nozzle 34c is supplied onto the surface of the current collector 12 from a substantially-normal direction of the current collector 12, for example, the relationship between the incident direction of silicon and the supply direction of the oxygen gas as described with reference to FIG. 5(a) and FIG. 6(a) can be satisfied.

Furthermore, a sheet-like current collector may be allowed to travel within a chamber by using rollers, and negative-electrode active material members may be formed on the traveling current collector surface.

With reference to FIG. 8(b), an example of a formation method using rollers will be described. Rollers 44, 45, and 46 are placed within a chamber, and by using them a sheet-like current collector 12 is allowed to travel in the direction of the arrow. At this time, after performing a first vapor deposition step in a region 47 on the roller 44, the current collector 12 having experienced the first vapor deposition is moved onto the roller 46 via the roller 45. Next, a second vapor deposition step is performed in a region 48 which is located on the roller 46 and which opposes the region 47. Thereafter, although not shown, the current collector 12 may be moved onto still another roller to perform third and later vapor deposition steps, or the direction of move of the current collector 12 may be reversed to perform a third vapor deposition step in the region 47.

In this example, the evaporation source 36 and the oxygen nozzle 34d are placed under the roller 45, and silicon and oxygen gas are supplied at portions of the current collector 12 that are located in the regions 47 and 48. Note that the number, positions, and silicon-emitting directions of evaporation sources 36 and the number, positions, and supply directions of the oxygen gas of the oxygen nozzle 34d are not limited to those in the illustrated example, so long as they are selected as appropriate to satisfy the relationship between the incident direction of silicon and the supply direction of the oxygen gas having been described with reference to FIG. 5(a) and FIG. 6(a).

A negative-electrode active material member 16 according to the present invention may be a particle composed of a single crystal, or may be a polycrystalline particle including a plurality of crystallites (crystal grains). Alternatively, it may be a particle composed of a microcrystal having a crystallite size or 100 nm or less. Alternatively, it may be a uniform amorphous.

Although there is no particular limitation, in order to prevent cracking of the negative-electrode active material member 16 due to an expansion upon charging, the thickness (width) of the negative-electrode active material member 16 is preferably no more than 50 μm, and more preferably no less than 1 μm and no more than 20 μm. Note that the thickness of the negative-electrode active material member 16 can be determined, among e.g. two to ten arbitrary negative-electrode active material members 16, as an average value of the width of a cross section which is parallel to the surface of the current collector 12 and taken along a plane corresponding to ½ of the thickness t of the negative-electrode active material member 16. If the aforementioned cross section is a substantially circular shape, it will be an average value of the diameter. Note that the "thickness t of the negative-electrode active material member 16" refers to the thickness of the negative-electrode active material member 16 along the normal direction N of the current collector 12, as mentioned earlier.

There is no particular limitation as to the material of the current collector 12 to be used in the present invention. Generally speaking, a material containing copper is suitable. For example, a rolled copper foil, a rolled copper alloy foil, an electrolytic copper foil, or an electrolytic copper alloy foil, whose surface has been subjected to a roughening treatment or whose surface has a ruggedness pattern formed thereon, can be used. As the copper alloy, precipitation hardening alloys such as a copper-zinc alloy, a copper-tin alloy, a copper-silver alloy, a copper-chromium alloy, a copper-tellurium alloy, a copper-titanium alloy, a copper-beryllium alloy, a copper-iron alloy, a copper-phosphorus alloy, a copper-zirconium alloy, and a copper-aluminum alloy, or composite alloys thereof, etc., are possible. The amount of heterogeneous metals added besides copper is preferably no less than 0.01% and no more than 10%. Moreover, a rolled copper foil, a rolled copper alloy foil, an electrolytic copper foil, an electrolytic copper alloy foil, or the like whose bump surface has been subjected to a roughening treatment can also be used. Other than these, titanium, nickel, stainless steel, or the like may also be used as the material of the current collector 12. Although there is no particular limitation, the thickness of the current collector 12 is no less than 1 μm and no more than 50 μm, for example.

As the current collector 12, a commercially-available rugged foil (surface roughness Ra: e.g. 0.3 μm or more) may be used, but it is preferable to form a regular ruggedness pattern including a plurality of bumps 13 on the surface of a metal foil containing the aforementioned material. The reason thereof will be described with reference to FIGS. 9(a) and (b). Note that, in these figures, active material members which have been formed through a single vapor deposition step, without changing the evaporation direction, are illustrated for simplicity.

Figure 9:
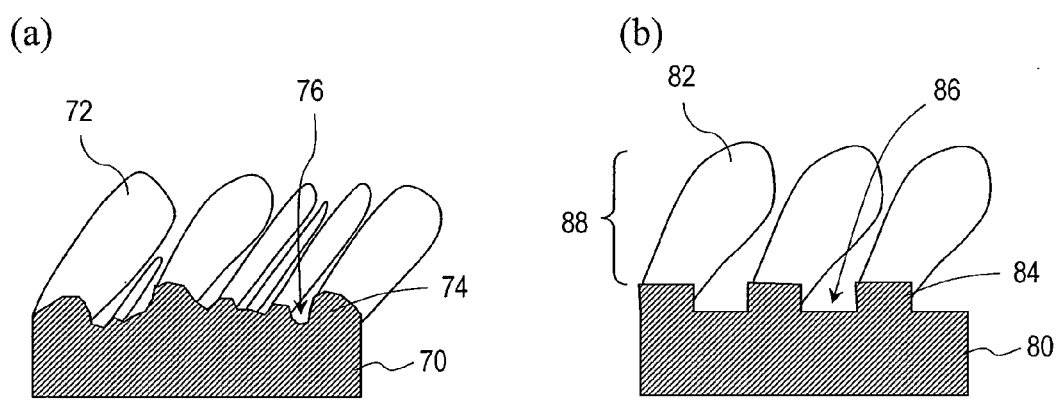
FIGS. 9 (a) and (b) are schematic cross-sectional views for describing the shapes of active material members obtained through a single vapor deposition step, respectively, in the case where irregular ruggednesses are formed, and in the case where regular ruggednesses are formed, on the current collector surface.

As shown in FIG. 9(a), if an active material is deposited via oblique vapor deposition on a current collector having irregular ruggednesses on its surface, e.g., a commercially-available rugged foil, the active material will be selectively deposited only on bumps 74 of the current collector 70 due to the shadowing effect, whereby active material members 72 are formed. Since an active material is not deposited in the portions which are shaded by the bumps 74 or the deposited active material, voids 76 are formed in between active material members 72. At this time, since the sizes (widths) of the active material members 72 and the intervals between adjoining active material members 72 vary depending on the sizes and shapes of the bumps 74 of the current collector 70, it is difficult to accurately control them.

On the other hand, as shown in FIG. 9(b), when an oxide (e.g. silicon oxide) is grown via oblique vapor deposition on a current collector 80 having a regular ruggedness pattern formed on its surface, an active material member 82 is formed on each bump 84 of the current collector 80 due to the shadowing effect, whereby an active material layer 88 composed of a plurality of active material members 82 is obtained, similarly to FIG. 9(a). At this time, regions between adjoining bumps 84 (also referred to as "grooves") are shaded by the bumps 84, so that no silicon oxide is deposited on the grooves, thus leaving voids 86. Therefore, by appropriately selecting the shape, size, arraying pitch, etc. of the bumps 84 in the ruggedness pattern, the layout and interval of the active material members 82 can be adjusted, and thus the proportion of the volume of the voids 86 occupied in the active material layer 88 (voidage) can be controlled. As a result, it becomes possible to more effectively suppress deformation of the negative electrode due to an expansion of the active material members 82. Note that the construction and formation method of a ruggedness pattern are also illustrated in an undisclosed patent application (Japanese Patent Application No. 2006-284918) by the Applicants of the present application.

The bumps 13 formed on the current collector 12 of the present embodiment are not limited to the pillar-like members as shown in FIG. 1. An orthogonal projection image of the bump 13 as seen from the normal direction N of the current collector 12 may be a polygon such as a square, a rectangle, a trapezoid, a diamond shape, or a parallelogram, a circle, an ellipse, or the like. The shape of their cross section parallel to the normal direction N of the current collector 12 may be a square, a rectangle, a polygon, a semicircular shape, or a shape which is a combination thereof. Moreover, the shape of the bumps 13 in a cross section perpendicular to the surface of the current collector 12 may be a polygon, a semicircular shape, an arc shape, or the like, for example. Note that, in the case where the boundaries between the bumps 13 and portions other than the bumps (also referred to as grooves, dents, etc.) are not clear, e.g., the cross section of the ruggedness pattern formed on the current collector 12 having a shape which is composed of curves, any portion of the entire surface having a ruggedness pattern that has an average height or more will be defined as a "bump 13", whereas any portion that has less than the average height will be defined as a "groove" or a "dent".

In order to obtain voids by the shadowing effect, the height of the bumps 13 is preferably 3 μm or more. On the other hand, in order to ensure strength of the bumps 13, it is preferably 30 μm or less, and more preferably 20 μm or less.

Although there is no particular limitation, the width of the upper face of each bump 13 is preferably 50 μm or less, whereby the deformation of the negative electrode 10 due to expansion stress of the negative-electrode active material members 16 can be more effectively suppressed. More preferably, it is 20 μm or less. On the other hand, the width of the upper face of each bump 13 is preferably 1 μm or more because, if the width of the upper face of each bump 13 is too small, a sufficient area of contact between the negative-electrode active material member 16 and the current collector 12 may not be obtained.

Furthermore, in the case where the bumps 13 are pillar-like members having side faces which are perpendicular to the surface of the current collector 12, the distance between adjoining bumps 13, i.e., the width of a groove, is preferably 30% or more, and more preferably 50% or more, of the width of each bump 13. As a result, sufficient voids are obtained between negative-electrode active material members 16 to greatly alleviate the expansion stress. On the other hand, if the distance between adjoining bumps 13 is too large, the thickness of the negative-electrode active material members 16 will be increased in order to ensure a capacity; therefore, the distance is preferably 250% or less, and more preferably 200% or less, of the width of each bump 13. Note that the width of the upper face of a bump 13 and the distance between adjoining bumps 13 refer to, respectively, a width and a distance in a cross section which is perpendicular the surface of the current collector 12 and contains the growth directions S of the negative-electrode active material members 16.

The upper face of each bump 13 may be flat, but preferably has ruggednesses, preferably with a surface roughness Ra of no less than 0.3 μm and no more than 5.0 μm. As used herein, "surface roughness Ra" refers to "arithmetic mean roughness Ra" as defined under the Japanese Industrial Standards (JISB 0601-1994), and can be measured by using a surface roughness measurement system or the like, for example. When the upper face of each bump 13 has ruggednesses with a surface roughness Ra of 0.3 μm or more, the negative-electrode active material members 16 are easy to grow on the bumps 13, so that sufficient voids can be formed between negative-electrode active material members 16 with a certainty. On the other hand, the current collector 12 will become thick if the surface roughness Ra is too large; therefore, it is preferable that the surface roughness Ra is 5.0 μm or less. Furthermore, when the surface roughness Ra of the current collector 12 is within the aforementioned range (no less than 0.3 μm and no more than 5.0 μm), a sufficient adhesion force can be obtained between the current collector 12 and the negative-electrode active material members 16, thus preventing peeling of the negative-electrode active material members 16.

Although there is no particular limitation as to the production method of the current collector 12, a metal foil may be subjected to an etching utilizing a resist resin or the like, thereby forming a predetermined pattern of grooves on the metal foil, such that any portion where a groove is not formed defines a bump 13, for example. Moreover, bumps may be formed on a metal foil by an electrodeposition or plating technique. It is also possible to employ a method of fitting a die or ceramic template with a ruggedness pattern formed thereon against the surface of a metal foil and pressurizing it, thus allowing the surface configuration of the die or the like to be transferred onto the metal foil.

Next, with reference to the drawings, an exemplary construction of a stacked type lithium-ion secondary battery which is obtained with the negative electrode 10 of the present embodiment will be described.

Figure 10:
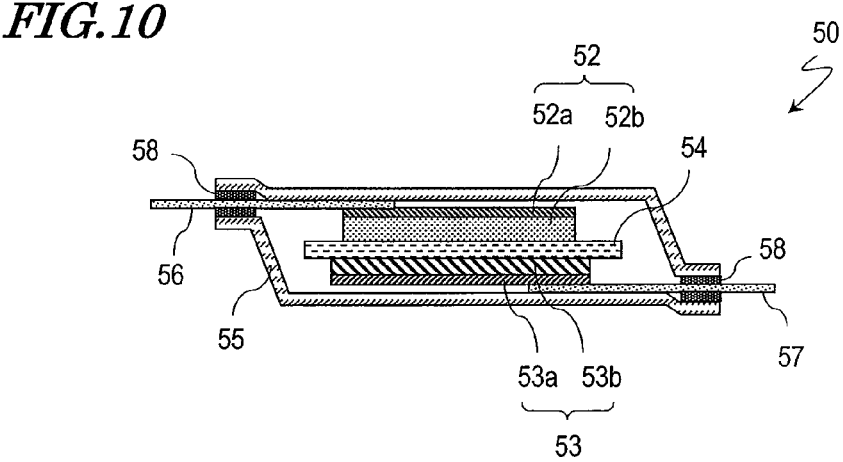
FIG. 10 A schematic cross-sectional view illustrating an exemplary coin-type lithium-ion secondary battery in which a negative electrode according to an embodiment of the present invention is used.

FIG. 10 is a schematic cross-sectional view illustrating an exemplary coin-type lithium-ion secondary battery in which the negative electrode of the present embodiment is employed. The lithium-ion secondary battery 50 has an electrode group including a positive electrode 52, a negative electrode 53, and a separator 54 provided between the negative electrode 53 and the positive electrode 52, and an outer case 55 accommodating the electrode group. The positive electrode 52 includes a positive electrode current collector 52a and a positive-electrode active material layer 52b formed on the positive electrode current collector 52a. The negative electrode 53 includes a negative electrode current collector 53a and a negative-electrode active material layer 53b formed on the negative electrode current collector 53a. The construction of the negative electrode 53 is similar to the construction described above with reference to FIGS. 1(a) and (b), for example. The negative electrode 53 and the positive electrode 52 are disposed so that the negative-electrode active material layer 53b and the positive-electrode active material layer 52b face each other via the separator 54. The positive electrode current collector 52a and the negative electrode current collector 53a are connected to one end of the positive electrode lead and one end of the negative electrode lead 57, respectively, whereas the other ends of the positive electrode lead 56 and the negative electrode lead 57 are taken out of the outer case 55. The separator 54 is impregnated with an electrolyte having lithium-ion conductivity. The negative electrode 53, the positive electrode 52, and the separator 54 are accommodated within the outer case 55 together with the electrolyte having lithium-ion conductivity, and is sealed with a resin material 58.

In the lithium-ion secondary battery 50, the positive-electrode active material layer 52b releases lithium ions upon charging, and occludes lithium ions which have been released from the negative-electrode active material layer 53b upon discharging. The negative-electrode active material layer 53b occludes lithium ions which have been released by the positive-electrode active material upon charging, and releases lithium ions upon discharging.

Although FIG. 10 illustrates an example of a stacked type battery, the lithium secondary battery of the present invention may be a cylindrical battery, a prismatic-type battery, or the like having a wound-type electrode group. A stacked type battery according to the present invention may have a structure in which positive electrodes and negative electrodes are stacked in three or more layers. However, it is preferable to employ a positive electrode having a positive-electrode active material layer on both faces or one face and a negative electrode having a negative-electrode active material layer on both faces or one face, so that every positive-electrode active material layer opposes a negative-electrode active material layer and every negative-electrode active material layer opposes a positive-electrode active material layer.

The lithium secondary battery of the present invention may include a negative electrode as has been described above with reference to FIG. 1 to FIG. 3, and the constituent elements other than the negative electrode are not particularly limited. As the material of the positive electrode current collector 52a, Al, an Al alloy, Ti, or the like may be used. For the positive-electrode active material layer 52b, a lithium-containing transition metal oxide such as lithium cobaltate ($LiCoO_2$), lithium nickelate ($LiNiO_2$), or lithium manganate ($LiMn_2O_4$) can be used, although this is not a limitation. The positive-electrode active material layer 52b may be composed only of a positive-electrode active material, or include a mixture which contains a positive-electrode active material, a binder agent, and a conductive agent. Furthermore, the positive-electrode active material layer 52b may be composed of a plurality of active material members, similarly to the negative-electrode active material layer 53b.

As the lithium-ion conductive electrolyte, various solid electrolytes or nonaqueous electrolyte solutions having lithium-ion conductivity may be used. As the nonaqueous electrolyte solution, what is obtained by dissolving a lithium salt in a nonaqueous solvent is preferably used. There is no particular limitation as to the composition of the nonaqueous electrolyte solution. There is no particular limitation as to the shapes and materials of the separator 54 and the outer case 55, and any material that is used for lithium secondary battery of various forms can be used.

EXAMPLES AND COMPARATIVE EXAMPLES

Negative electrodes of Examples and Comparative Examples as well as electrodes using the negative electrodes were produced, and their characteristics were evaluated, as will be described below.
(i) Example Negative Electrodes No. 1 to No. 3

As Examples, negative electrodes No. 1 to No. 3 in which the number n of layers composing the negative-electrode active material member (number of layers) were different were produced, and the methods and constructions thereof will be described.

<Production of Current Collector>

A current collector of the present Example was produced with a method as follows. First, on a rolled copper foil (manufactured by Nippon Foil Mfg. Co., Ltd.) having a thickness of 14 μm, a dry resist film (manufactured by Nippon Kasei Chemical Co., Ltd) was laminated. Next, by using a photomask in which a pattern of dots which were 10 μm across were arrayed with an interval of 10 μm along an X direction and along a Y direction orthogonal to the X direction, a dry resist film on a copper foil was exposed to light, and developed with an $NaHCO_3$ aqueous solution. Thus, a plurality of apertures were formed in the dry resist film through which to expose the surface of the current collector. Next, a copper electrolytic plating was performed on the surface of the current collector exposed through the apertures, thus forming a plurality of bumps (height: 6 μm) of a quadrangular prism structure having a square upper face (10 μm×10 μm). Thereafter, the dry resist film was removed by using an aqueous solution of sodium hydroxide.

Next, the copper foil having the plurality of bumps formed thereon by the above method was cut into a size of 40 mm×40 mm, thus obtaining a current collector.

<Production Method and Analysis Results of Negative Electrode No. 1>

After producing the current collector by the above method, an active material layer was formed on the surface of this current collector, thus obtaining negative electrode No. 1.

Figure 4:
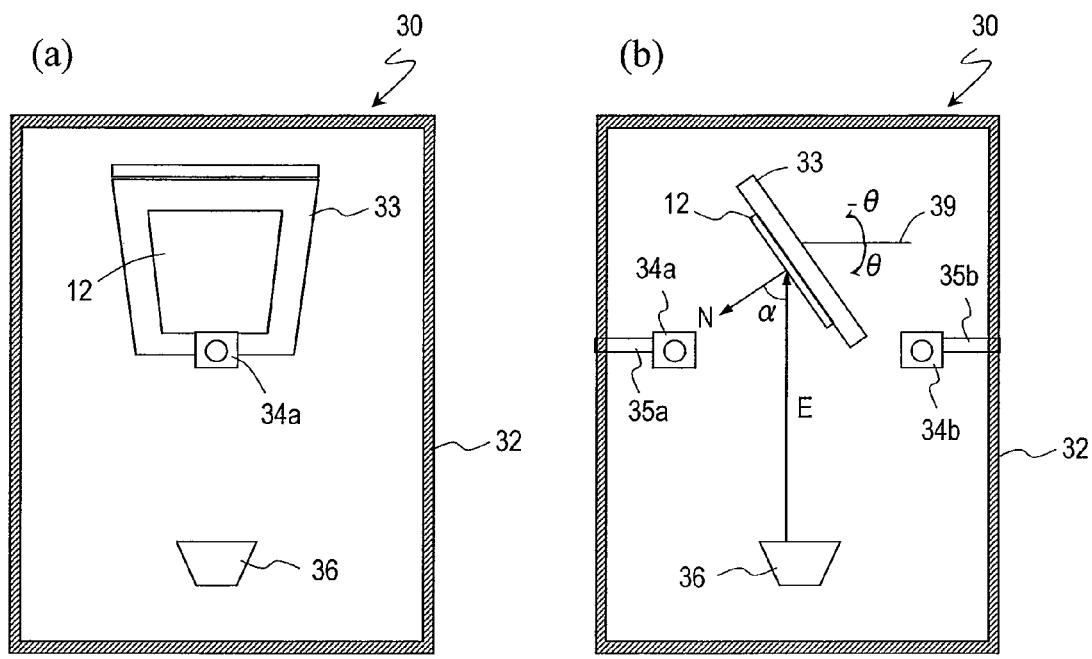
FIGS. 4 (a) and (b) are diagrams illustrating an exemplary construction of a vapor deposition apparatus used for the formation of an active material layer, being schematic cross-sectional views as viewed from directions which are 90° apart.

The formation of the active material layer was performed by a method similar to the method described above with reference to FIG. 4 to FIG. 6, using a vapor deposition apparatus (manufactured by ULVAC, Inc.) 30 having a construction described with reference to FIGS. 4(a) and (b). As the evaporation source 36, elemental silicon with a purity of 99.9999% (manufactured by Kojundo Chemical Lab. Co., Ltd) was used.

The current collector formed by the above method was fixed on the stage 33, which was placed in the chamber 32. First, the stage 33 was rotated so that its angle θ from the horizontal plane 39 was 60°, and in this state, silicon vapor from the evaporation source 36 was supplied onto the surface of the current collector, together with an oxygen gas which was emitted through the nozzle 34a disposed on the side opposing the surface of the current collector, thus vapor-depositing a compound containing silicon and oxygen (silicon oxide) (first vapor deposition step). The acceleration voltage of an electron beam with which the evaporation source 36 was irradiated was −8 kV, with the emission being set to 250 mA. Moreover, the flow rate of the oxygen gas was set to 20 sccm.

Next, the stage 33 was rotated so that its tilting angle θ was −60°, and the nozzle for supplying the oxygen gas was switched to the nozzle 34b, thus performing a vapor deposition of silicon oxide (second vapor deposition step). Conditions other than the tilting angle θ and the nozzle to be used were similar to the conditions in the first vapor deposition step.

In this manner, the tilting angle of the stage 33 was switched between 60° and −60°, and the nozzles for supplying the oxygen gas were accordingly switched, thus performing up to a sixth vapor deposition step, whereby negative electrode No. 1 (number of layers n=6) was obtained. Note that the vapor deposition time of each vapor deposition step was equal, and was adjusted so that the thickness of the active material layer after the vapor deposition was 20 μm.

A cross-sectional SEM observation of the active material layer of negative electrode No. 1 was made, whereby negative-electrode active material members were confirmed each having a portion continuously extending in a zigzag manner from the bottom face in a direction away from the surface of the current collector. Next, through an EPMA analysis of the oxygen distribution in each negative-electrode active material member, it was found that a region of high oxygen concentration, continuously extending in a zigzag manner, existed corresponding to the density gradation which was found in the cross-sectional SEM observation. As the thickness of the region of high oxygen concentration, the thickness of a region having the chemical composition $SiO_x$ ($x \geq 1.0$) was measured from the density gradation in the SEM observation, whereby the thickness of the region of high oxygen concentration was inferred to be about 1.3 μm. Moreover, the oxygen content in the entire active material layer was analyzed by a combustion method, which indicated that an average value of the molar ratio x of the oxygen amount relative to the silicon amount was 0.6.

<Production Method and Analysis Results of Negative Electrode No. 2>

Except for repeating up to first to tenth vapor deposition steps, negative electrode No. 2 (number of layers n:10) was produced by a method similar to that of negative electrode No. 1 described above. Note that the vapor deposition time of each vapor deposition step for forming the active material layer was equal, and was adjusted so that the thickness of the active material layer after the vapor deposition was 20 μm.

Through a cross-sectional SEM observation and an analysis using an EPMA of the active material layer of negative electrode No. 2, it was confirmed that, similarly to negative electrode No. 1, the negative-electrode active material members existed each having a region of high oxygen concentration continuously extending in a zigzag-manner from the bottom face in a direction away from the surface of the current collector. By a method similar to that of negative electrode No. 1, the thickness of the region of high oxygen concentration was measured, which read about 0.8 μm. The oxygen content in the entire active material layer was analyzed by a combustion method, which indicated that an average value of the molar ratio x of the oxygen amount relative to the silicon amount was 0.6.

<Production Method and Analysis Results of Negative Electrode No. 3>

Except for repeating up to first to thirty-fifth vapor deposition steps, negative electrode No. 3 (number of layers n:35) was produced by a method similar to that of negative electrode No. 1 described above. Note that the vapor deposition time of each vapor deposition step for forming the active material layer was equal, and was adjusted so that the thickness of the active material layer after the vapor deposition was 20 μm.

Through a cross-sectional SEM observation of the active material layer of negative electrode No. 3, because of the large number of layers, it was not clearly confirmed that each negative-electrode active material member had a zigzag outer shape. However, it was confirmed from the density gradation in a cross-sectional SEM observation that, similarly to negative electrodes No. 1 and No. 2, a region continuously extending in a zigzag manner from the bottom face in a direction away from the surface of the current collector had been formed in the interior of the negative-electrode active material member. This region corresponded to the region of high oxygen concentration. By a method similar to that of negative electrode No. 1, the thickness of the region of high oxygen concentration was measured, which read about 0.2 μm. The oxygen content in the entire active material layer was analyzed by a combustion method, which indicated that an average value of the molar ratio x of the oxygen amount relative to the silicon amount was 0.6.

(ii) Production of Comparative Example Negative Electrodes A to C

As Comparative Examples, negative electrodes A to C were produced, and the methods and constructions thereof will be described.

<Production Method and Analysis Results of Negative Electrode A>

By using a current collector which was produced by a method similar to those of the negative electrodes of Examples, an active material layer having negative-electrode active material members each tilted only in one direction was produced, and this was designated negative electrode A (number of layers n=1). Except that the number of times of vapor deposition was one, the formation of the active material layer was performed by a method similar to that of negative electrode No. 1 described above. Moreover, the vapor deposition time was adjusted so that the thickness of the active material layer was 20 μm.

Through an EPMA analysis of the oxygen concentration distribution in each negative-electrode active material member of negative electrode A, it was found that a region of high oxygen concentration had been formed along the side face closer to the nozzle 34a for supplying oxygen. The region of high oxygen concentration extended from the bottom face to the upper face of the negative-electrode active material member in a direction away from the surface of the current collector, and had a chemical composition represented as $SiO_x$ ($x \geq 1.0$). The oxygen content in the entire active material layer was analyzed by a combustion method, which indicated that an average value of the molar ratio x of the oxygen amount relative to the silicon amount was 0.6.

<Production Method and Analysis Results of Negative Electrode B>

By using a current collector which was produced by a method similar to those of the negative electrodes of Examples, an active material layer was formed by employing SiO as the evaporation source 36, without introducing any oxygen gas through a nozzle.

The formation of the active material layer was performed by a method similar to that of negative electrode No. 2 of Example 2 described above, except that: sintered SiO (manufactured by Sumitomo Titanium Corporation) was used as the evaporation source 36; the acceleration voltage of the electron beam was set to −8 kV and the emission was set to 30 mA; and silicon and oxygen emitted from the evaporation source 36 were supplied onto the current collector surface. In this manner, through ten vapor deposition steps from the first to tenth, negative electrode B (number of layers n=10) was produced. Since SiO is sublimable, care was taken so that the electron beam would not concentrate at any particular point of the SiO. The vapor deposition time of each vapor deposition step was equal, and was adjusted so that the thickness of the active material layer was 20 μm.

Through an EPMA analysis of the oxygen concentration distribution in each negative-electrode active material member of negative electrode B, it was found that the oxygen concentration in the interior of the negative-electrode active material member was uniform. The oxygen content in the entire active material layer was analyzed by a combustion method, which indicated that an average value of the molar ratio x of the oxygen amount relative to the silicon amount was 0.6.

<Production Method and Analysis Results of Negative Electrode C>

The active material layers of negative electrodes No. 1 to No. 3 and negative electrodes A and B described above were all formed by oblique vapor deposition, and were composed of a plurality of pillar-like negative-electrode active material members. Herein, an active material layer having a structure in which two kinds of layers with different oxygen concentrations were alternately stacked was formed by a vapor deposition from a substantially-normal direction of the current collector surface, instead of oblique vapor deposition, thus obtaining negative electrode C.

As the current collector, a commercially-available electrolytic copper foil (manufactured by Furukawa Circuit Foil Co., Ltd.) was used. Similarly to the above-described Examples, the vapor deposition apparatus 30 shown in FIGS. 4(a) and (b) was used for the formation of the active material layer; however, the stage 33 on which to fix the current collector was fixed so as to be parallel to the horizontal plane 39 (angle θ=0°, and the evaporation source 36 was placed so that silicon atoms from the evaporation source 36 would strike the current collector surface along the normal direction of the current collector. The oxygen gas was intermittently introduced into the chamber 32 by using both nozzles 34a and 34b. Specifically, during vapor deposition, introduction of oxygen gas and non-introduction of oxygen gas were alternately repeated, each 10 times for the same amount of time. The period of introducing oxygen gas and the period of not introducing oxygen gas were adjusted so that the thickness of the active material layer after the vapor deposition was 10 μm.

The reason why the thickness of the active material layer was prescribed to be 10 μm is as follows. When negative-electrode active material members are formed by performing oblique vapor deposition, the voidage in the active material layer is 50% or more. If this is taken into consideration, by prescribing the thickness of the active material layer of negative electrode C hardly including any voids to be 10 μm, i.e., ½ of the thickness 20 μm of the active material layer of the negative electrodes of Examples having a voidage of 50% or more, it can be ensured that the active material mass per unit area is about the same between the active material layers of Examples and the active material layer of negative electrode C.

Through an EPMA analysis of the oxygen distribution in the active material layer of negative electrode C, it was confirmed that ten layers of high oxygen concentration having a chemical composition represented as $SiO_x$ ($X \geq 1.0$) and ten layers of low oxygen concentration having a chemical composition represented as $SiO_x$ ($X<1.0$) had been alternately stacked. From the density gradation in a cross-sectional SEM observation, it was also found that the active material layer had a multilayer structure composed of layers with a thickness of 0.8 μm or less. Furthermore, the oxygen content in the entire active material layer was analyzed by a combustion method, which indicated that an average value of the molar ratio x of the oxygen amount relative to the silicon amount was 0.6.

(iii) Production of Batteries Using Example and Comparative Example Negative Electrodes and Evaluations Thereof <Production of Batteries No. 1 to No. 3 and Batteries A to C>

By using negative electrodes No. 1 to No. 3 and negative electrodes A to C produced by the above methods, Example batteries No. 1 to No. 3 and Comparative Example batteries A to C having the construction as described earlier with reference to FIG. 10 were produced. Hereinafter, referring back to FIG. 10, the production method for the batteries will be described.

First, a positive electrode 52 was produced. Ten grams of lithium cobaltate ($LiCoO_2$) powder having an average particle size of about 10 μm as a positive-electrode active material, 0.2 g of acetylene black as a conductive agent, 0.5 g of polyvinylidene fluoride powder as a binder agent, and a suitable amount of N-methyl-2-pyrrolidone (NMP) were mixed well, thereby preparing a paste of positive electrode mixture. The resultant paste was applied onto one face of a positive electrode current collector 52a composed of an aluminum foil having a thickness of 20 μm, and after drying, a positive-electrode active material layer 52b was formed through rolling. Thereafter, the positive electrode current collector 52a having the positive-electrode active material layer 52b formed on its surface was cut into a predetermined shape, thus forming a positive electrode 52 for a test battery. The thickness of the positive-electrode active material layer 52b formed on one face of the positive electrode current collector (aluminum foil) 52a was 100 μm. The size of the positive electrode was 30 mm×30 mm. A lead was connected to the rear face of the positive electrode current collector 52a (the face on which the positive-electrode active material layer 52 was not formed).

Next, negative electrodes No. 1 to No. 3 and negative electrodes A to C obtained by the above methods were each cut into a size of 31 mm×31 mm, thus forming a negative electrode 53 for a test battery. On the rear face of the negative electrode current collector 53a, a lead terminal not having any negative-electrode active material layer 53b was connected. Since the negative electrode has an initial irreversible capacity (i.e., only during the initial charging and discharging, the discharging (lithium desorption reaction) capacity is small relative to the charging (lithium insertion reaction) capacity), before constructing a battery using each negative electrode, an irreversible capacity was measured of a model cell in which metal lithium was used as a counter electrode, and a treatment of adding an amount of metal lithium corresponding to each irreversible capacity was performed by vapor deposition technique.

By using the positive electrode 52 and the negative electrode 53 produced in this manner, test batteries No. 1 to No. 3 and batteries A to C for charge-discharge cycle characteristics evaluation were produced.

First, the positive-electrode active material layer 52b of the positive electrode 52 and the negative-electrode active material layer 53b of the negative electrode 53 were allowed to oppose each other via a separator 54, thus constructing a thin electrode group. As the separator 54, a polyethylene microporous film (thickness: 20 μm) manufactured by Asyahi Kasei Chemicals Corporation was used. This electrode group was inserted into an outer case 55 composed of an aluminum laminate sheet, together with an electrolyte. As the electrolyte, a nonaqueous electrolyte solution obtained by mixing ethylene carbonate (EC) and ethyl methyl carbonate (EMC) at a volume ratio of 1:1 and dissolving $LiPF_6$ in this mixture at a concentration of 1.0 mol/L was used. The nonaqueous electrolyte solution was used to impregnate each of the positive-electrode active material layer 52b, the negative-electrode active material layer 53b, and the separator 54. Thereafter, in a state where the positive electrode lead 56 and the negative electrode lead 57 were taken outside, the ends of the outer case 55 were welded under a vacuum, thus completing the test battery. The test batteries in which negative electrode No. 1, negative electrode No. 2, negative electrode No. 3, negative electrode A, negative electrode B, and negative electrode C were used were respectively designated battery No. 1, battery No. 2, battery No. 3, battery A, battery B, and battery C.

<Evaluation of Batteries in which Negative Electrodes No. 1 to No. 3 and Negative Electrodes A to C are Used>

Batteries No. 1 to No. 3 and batteries A to C obtained by the above method were each accommodated in a thermostat bath at 20° C., and charged and discharged by a constant-current constant-voltage method. Herein, charging was performed with a constant current of 1C rate (where 1C is a current value which causes a total battery capacity to be completely charged or discharged in 1 hour) until the battery voltage reached 4.2 V, and after reaching 4.2 V, charging was performed with a constant voltage until the current value reached 0.05° C. After charging, a rest of 30 minutes was observed. Next, discharging was performed with a constant current of 1C rate, and after the battery voltage reached 2.5 V, discharging was again performed with a constant current of 0.2C until the battery voltage reached 2.5 V. After the second discharging, a rest of 30 minutes was observed.

After repeating 150 cycles of the above-described charging and discharging, the rate of a total discharge capacity at the $150^{th}$ cycle relative to a total discharge capacity at the initial cycle was defined as a capacity retention rate. Furthermore, each battery was disassembled after the cycles and the state of the negative electrode was observed. The results are shown in Table 1.

TABLE 1

| battery | number of layers in negative electrode | negative electrode construction | capacity retention rate (%) | state of negative electrode after charging and discharging cycle test |
|---|---|---|---|---|
| No. 1 | 6 | | 75 | good |
| No. 2 | 10 | | 82 | good |
| No. 3 | 35 | | 86 | good |
| A | 1 | evaporation direction was not switched | 48 | peeling |
| B | 10 | uniform oxygen concentration distribution | 61 | pulverized |
| C | 10 | oblique vapor deposition was not performed | 63 | wrinkles |

As shown in Table 1, in batteries No. 1 to No. 3 in which Example negative electrodes No. 1 to No. 3 were used, the capacity retention rate at the $150^{th}$ cycle was greater than in batteries A to C in which Comparative Example negative electrodes A to C were used, indicating that the structure of Example negative electrodes suppressed cycle deterioration. Among batteries No. 1 to No. 3, batteries No. 2 and No. 3 which had an active material layer with a large number of layers showed better cycle characteristics than those of battery No. 1. Furthermore, after performing 150 cycles of charging and discharging, each battery was disassembled for observing the state of the negative electrode. Deformation such as wrinkles was not observed in electrodes No. 1 to No. 3 and electrodes A and B, whereas wrinkles occurred in electrode C.

In electrodes No. 1 to No. 3 and electrodes A and B, the stress acting on the current collector is reduced presumably because voids are formed between negative-electrode active material members, thereby suppressing occurrence of wrinkles. However, peeling of the negative-electrode active material members was observed in the negative-electrode active material members of electrode A. This is presumably because a region of high oxygen concentration was formed solely on one side face portion, so that the expansion stress occurring in the negative-electrode active material members was not sufficiently alleviated.

Furthermore, in some of the negative-electrode active material members of electrode B, cracking occurred in the negative-electrode active material members, and a portion of each negative-electrode active material member was pulverized to break free from the each negative-electrode active material member. This is presumably because the oxygen concentration distribution was substantially uniform so that no region (region of high oxygen concentration) for alleviating the expansion stress occurring in the interior of the negative-electrode active material members was formed. Note that peeling of a negative-electrode active material member means peeling of the negative-electrode active material member from the current collector surface. Moreover, pulverization of a negative-electrode active material member means a part of the negative-electrode active material member cracking to become micropowder of active material and being detached from the negative-electrode active material member. Therefore, even if pulverization occurs, a portion of the negative-electrode active material member remains on the current collector, so that deteriorations in characteristics de to charging and discharging cycles are reduced as compared to the case where peeling of a negative-electrode active material member occurs.

(iv) Study of Thickness of Region of High Oxygen Concentration in Negative-Electrode Active Material Member Next, the thickness of the region of high oxygen concentration (first region) in each negative-electrode active material member was studied, and the method and results thereof will be described.

<Production Method of Negative Electrodes No. 4 to No. 11>

On the surface of a current collector, an active material layer (number of layers n=10) was formed by a method similar to that of negative electrode No. 2 except for the flow rate of oxygen gas from the nozzles, thus obtaining negative electrodes No. 4 to No. 7 in which the region of high oxygen concentration formed in each negative-electrode active material member had different thicknesses. Moreover, an active material layer (number of layers n=35) was formed by a method similar to that of negative electrode No. 3 except for the flow rate of oxygen gas from the nozzles, thus obtaining negative electrodes No. 8 to No. 11 in which the region of high oxygen concentration formed in each negative-electrode active material member had different thicknesses. In the present Example, the region having a chemical composition of $SiO_x$ ($x \geq 1.0$), i.e., a region in which the molar ratio of the oxygen amount relative to the silicon amount was 1.0 or more was defined as a "region of high oxygen concentration".

In these negative electrodes, by controlling the flow rate of oxygen gas from the nozzles when forming the active material layer, the thickness of the region of high oxygen concentration formed in each negative-electrode active material member was adjusted. Note that the current collectors used for these negative electrodes were similar to the current collector described in (i) above.

The flow rate of the oxygen gas introduced into the chamber 32 through a nozzle when forming the active material layer of each negative electrode is shown in Table 2. Moreover, by a method similar to those of negative electrodes No. 1 to No. 3 described above, the oxygen concentration distribution in the negative-electrode active material members of negative electrodes No. 4 to No. 11 was determined, and the thickness of the region of high oxygen concentration of each negative-electrode active material member was calculated; the results thereof are also shown in Table 2.

TABLE 2

| negative electrode | number of layers | oxygen gas flow rate (sccm) | thickness of region of high oxygen concentration ($SiO_x$, $x \geq 1$) (μm) | thickness of active material layer (μm) |
|---|---|---|---|---|
| No. 4 | 10 | 3 | 0.15 | 20 |
| No. 5 | 10 | 5 | 0.20 | 20 |
| No. 6 | 10 | 25 | 1.00 | 20 |
| No. 7 | 10 | 30 | 1.20 | 20 |
| No. 8 | 35 | 3 | 0.04 | 20 |
| No. 9 | 35 | 5 | 0.06 | 20 |
| No. 10 | 35 | 25 | 0.28 | 20 |
| No. 11 | 35 | 30 | 0.35 | 20 |

<Evaluations of Batteries in which Negative Electrodes No. 4 to No. 11 are Used>

By using negative electrodes No. 4 to No. 11 produced by the above methods, stacked type test batteries of the construction described above with reference to FIG. 10 were produced. The production method was similar to the production method of batteries No. 1 to No. 3 described in (iii) above. The test batteries in which negative electrode No. 4 to negative electrode No. 11 were used were respectively designated battery No. 4 to battery No. 11.

Battery No. 4 to battery No. 11 were each accommodated in a thermostat bath at 20° C., and charged and discharged by a constant-current constant-voltage method, and the charge-discharge cycle characteristics of each battery were evaluated. The conditions of charging and discharging were similar to the conditions described in (iii) above. After repeating 150 cycles of charging and discharging, the rate of a total discharge capacity at the $150^{th}$ cycle relative to a total discharge capacity at the initial cycle was defined as a capacity retention rate. Furthermore, each battery was disassembled after the cycles and the state of the negative electrode was observed. The results are shown in Table 3.

TABLE 3

| | negative electrode construction | | | | state of negative electrode after charging and discharging cycle test |
|---|---|---|---|---|---|
| battery | number of layers | thickness of region of high oxygen concentration ($SiO_x$, $x \geq 1$) (μm) | initial capacity (mAh) | capacity retention rate (%) | |
| No. 4 | 10 | 0.15 | 45 | 66 | pulverized |
| No. 5 | 10 | 0.20 | 43 | 80 | good |
| No. 6 | 10 | 1.00 | 33 | 81 | good |
| No. 7 | 10 | 1.20 | 28 | 85 | good |
| No. 8 | 35 | 0.04 | 45 | 68 | pulverized |
| No. 9 | 35 | 0.06 | 43 | 84 | good |
| No. 10 | 35 | 0.28 | 34 | 89 | good |
| No. 11 | 35 | 0.35 | 29 | 92 | good |

From the results shown in Table 2 and Table 3, it was found that, when the thickness of the region of high oxygen concentration ($SiO_x$, $x \geq 1.0$) becomes small, pulverization of the negative-electrode active material members occurs, thus deteriorating the charge-discharge cycle characteristics. This is presumably because the expansion stress occurring in the region of low oxygen concentration cannot be sufficiently alleviated if the thickness of the region of high oxygen concentration ($SiO_x$, $x \geq 1.0$) is small relative to the thickness of the region of low oxygen concentration ($SiO_x$, $x < 1.0$). On the other hand, if the thickness of the region of high oxygen concentration is too large relative to the thickness of the region of low oxygen concentration, cycle deteriorations can be suppressed, but a sufficient capacity cannot be obtained because the lowering of the initial capacity becomes substantial. The reason is that the oxygen content (average value of the molar ratio of the oxygen amount relative to the silicon amount) in the entire active material layer becomes large, such that the reversible capacity is reduced. Such a tendency also exists in the cases where the number of layers in the active material layer is 10 and 35.

Therefore, assuming that the thickness of the entire active material layer is h μm, the number of layers is n, and the thickness of the region of high oxygen concentration ($SiO_x$, $x \geq 1.0$) is Y μm, it was found that the preferable range of Y is expressed by the following inequality:

$$(h/n)/10 \leq Y \leq (h/n)/2.$$

Note that, although the negative-electrode active material members in the above Examples all have a region of high oxygen concentration which extends in a zigzag manner from the bottom face of each negative-electrode active material member in the vertical direction, the oxygen concentration distribution in the negative-electrode active material members according to the present invention is not limited thereto. As has been described earlier with reference to FIGS. 3(a) to (c), the expansion stress alleviation effect of the present invention can be obtained so long as there are a region of high oxygen concentration extending in the vertical direction from the bottom face of each negative-electrode active material member and regions of low oxygen concentration alternately disposed on both sides of the region of high oxygen concentration.

INDUSTRIAL APPLICABILITY

The present invention is applicable to lithium secondary batteries in various forms, but will be particularly advantageous when applied to a lithium secondary battery which is required to have a high capacity and good cycle characteristics. There is no particular limitation as to the shape of lithium secondary battery to which the present invention is applicable, and any shape may be used, e.g., coin-type, button-type, sheet-type, cylindrical-type, flat-type, or prismatic-type. Moreover, the configuration of the electrode group consisting of a positive electrode, a negative electrode, and a separator may be a wound type or a stacked type. Furthermore, the battery size may be small, as used for small-sized portable devices or the like, or large, as used for electric vehicles or the like. For example, a lithium secondary battery according to the present invention can be used for a power supply of a mobile information terminal, a portable electronic device, a small-sized power storage device for households, a motorcycle, an electric vehicle, a hybrid electric vehicle, or the like. However, there is no particular limitation as to its usage.

The invention claimed is:

1. A negative electrode for a lithium secondary battery, comprising:
   a current collector; and
   an active material layer formed on the current collector, wherein,
   the active material layer includes a plurality of negative-electrode active material members disposed on the current collector;
   each negative-electrode active material member is an oxide, including a first region of a relatively high oxygen concentration and a plurality of second regions having an oxygen concentration which is lower than that of the first region;
   the first region extends from a bottom face of each negative-electrode active material member in a direction away from a surface of the current collector; and
   the plurality of second regions are disposed alternately on both sides of the first region.

2. The negative electrode for a lithium secondary battery of claim 1, wherein the first region extends in a zigzag manner from the bottom face of each negative-electrode active material member in a direction away from the surface of the current collector.

3. The negative electrode for a lithium secondary battery of claim 1, wherein,
   a plurality of bumps are formed on the surface of the current collector; and
   each negative-electrode active material member is formed on the corresponding bump.

4. The negative electrode for a lithium secondary battery of claim 3, wherein the plurality of bumps are regularly disposed on the surface of the current collector.

5. The negative electrode for a lithium secondary battery of claim 1, wherein each negative-electrode active material member includes a plurality of portions stacked on the surface of the current collector, growth directions of the plurality of portions being alternately tilted in opposite directions with respect to a normal direction of the current collector.

6. The negative electrode for a lithium secondary battery of claim 5, wherein a part of the first region is disposed at an interface between vertically-adjoining portions among the plurality of portions.

7. The negative electrode for a lithium secondary battery of claim 2, wherein the first region includes a plurality of bent portions, the plurality of bent portions being alternately disposed on opposite side faces of each negative-electrode active material member.

8. The negative electrode for a lithium secondary battery of claim 1, wherein each negative-electrode active material member contains silicon oxide.

9. The negative electrode for a lithium secondary battery of claim 8, wherein a molar ratio of an oxygen amount relative to a silicon amount in the first region is no less than 0.6 but less than 2.0.

10. A lithium-ion secondary battery comprising:
   a positive electrode capable of occluding and releasing lithium ions;
   the negative electrode for a lithium secondary battery of claim 1;
   a separator disposed between the positive electrode and the negative electrode for a lithium secondary battery; and
   an electrolyte having lithium-ion conductivity.

* * * * *